(12) United States Patent
Krajca et al.

(10) Patent No.: US 11,964,442 B2
(45) Date of Patent: *Apr. 23, 2024

(54) FORMING APPARATUS, METHOD, AND SYSTEM

(71) Applicant: The Boeing Company, Chicago, IL (US)

(72) Inventors: Scott Krajca, Seattle, WA (US); Long Ly, Renton, WA (US); Chace Wilcoxson, Kent, WA (US); Darrell Jones, Mill Creek, WA (US); Kurtis Willden, Kent, WA (US); Michael A. Lee, Kent, WA (US); Josiah Brubaker, Bellingham, WA (US); Michael Karas, Bainbridge Island, WA (US); Joseph Warren, Maple Valley, WA (US); Pavel Lesovoy, Fife, WA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,766

(22) Filed: Oct. 27, 2021

(65) Prior Publication Data
US 2022/0176648 A1    Jun. 9, 2022

Related U.S. Application Data

(60) Provisional application No. 63/199,093, filed on Dec. 7, 2020.

(51) Int. Cl.
*B29C 70/34*    (2006.01)
*B29C 43/10*    (2006.01)
(Continued)

(52) U.S. Cl.
CPC ............ *B29C 70/342* (2013.01); *B29C 43/10* (2013.01); *B29C 43/3642* (2013.01); *B29C 70/54* (2013.01); *B29C 2043/3649* (2013.01)

(58) Field of Classification Search
CPC ... B29C 70/342; B29C 43/10; B29C 43/3642; B29C 70/54; B29C 2043/3649
See application file for complete search history.

(56) References Cited

U.S. PATENT DOCUMENTS 6,814,916 B2    11/2004    Willden et al.
7,118,370 B2    10/2006    Willden et al.
(Continued)

FOREIGN PATENT DOCUMENTS

DE    10 2011050099    11/2012
EP    3 067 187    9/2016

OTHER PUBLICATIONS

Solvay: P720X Release Film (Mar. 21, 2013).
European Patent Office, Extended European Search Report, App. No. 21208498.2 (dated Apr. 29, 2022).

*Primary Examiner* — Yunju Kim
(74) *Attorney, Agent, or Firm* — Walters & Wasylyna LLC

(57) ABSTRACT

The disclosed forming apparatus includes a frame. The frame defines a vertical axis, a horizontal axis, and a longitudinal axis. A carriage is movably connected to the frame. A first stomp foot is movably connected to the carriage such that it may move along the vertical axis. A first end effector is movably connected to the carriage. The first end effector is controlled by an actuator. The disclosed method for forming a composite part includes applying at least one ply of composite material over a forming surface of a forming tool and deforming the at least one ply of composite material over the forming surface of the forming tool with a forming apparatus.

20 Claims, 19 Drawing Sheets

(51) Int. Cl.
   *B29C 43/36* (2006.01)
   *B29C 70/54* (2006.01)

(56) References Cited

U.S. PATENT DOCUMENTS

| | | |
|---|---|---|
| 7,137,182 B2 | 11/2006 | Nelson |
| 7,651,650 B2 | 1/2010 | Willden et al. |
| 8,142,181 B2 | 3/2012 | Willden et al. |
| 8,236,222 B2 | 8/2012 | Henderson et al. |
| 8,336,596 B2 | 12/2012 | Nelson et al. |
| 8,578,995 B2 | 11/2013 | Nelson |
| 8,808,490 B2 | 8/2014 | Hagman et al. |
| 9,656,829 B2 | 5/2017 | Hagman et al. |
| 9,663,247 B2 | 5/2017 | Rotter et al. |
| 9,873,230 B1 | 1/2018 | Desjardien et al. |
| 10,086,596 B2 | 10/2018 | Desjardien et al. |
| 10,456,960 B2 | 10/2019 | Chapman et al. |
| 2004/0043196 A1 | 3/2004 | Willden et al. |
| 2006/0291991 A1* | 12/2006 | Willden ............... B29C 70/342 414/808 |
| 2016/0263879 A1* | 9/2016 | Desjardien ............. B32B 41/00 |
| 2016/0368226 A1 | 12/2016 | Encinosa et al. |
| 2019/0070772 A1 | 3/2019 | Stone |
| 2020/0001551 A1 | 1/2020 | Anderson et al. |
| 2020/0016797 A1 | 1/2020 | Chapman et al. |
| 2020/0130294 A1* | 4/2020 | Halbritter ............ B29C 70/543 |
| 2021/0107242 A1* | 4/2021 | Hopkins ............... B29C 70/342 |

* cited by examiner

US 11,964,442 B2

FORMING APPARATUS, METHOD, AND SYSTEM

PRIORITY

This application claims priority from U.S. Ser. No. 63/199,093 filed on Dec. 7, 2020.

FIELD

The present application relates to manufacturing of composite parts, and is particularly directed to an apparatus, method, and system of ply by ply forming of composite parts.

BACKGROUND

Formed composite structures are commonly used in applications where light weight and high strength are desired, such as in aircraft and vehicles. Often, these applications utilize contoured parts that must be formed and then cured. Conventional formation of composite structures, particularly relatively large composite structures or composite structures having a complex contour, requires extensive manual labor prior to curing. For example, composite fiber plies (e.g., pre-impregnated fiber plies or dry fabric) are laid by hand over a shaped forming tool or mandrel. The part is then cured, often by heating and pressure. The resulting part matches the shape of the forming tool. However, manual layup of the fiber plies is time consuming and laborious.

Some known composite manufacturing processes attempt to automate a portion of the formation operation. As an example, a drape forming process includes heating a laminate of pre-impregnated fiber plies ("composite charge") and forcing it around a mandrel with the use of a vacuum bag. However, this method has achieved limited success on thick laminates or structures with more complex shapes. As another example, a compactor may be used to compress the composite charge against a tool surface during fabrication. However, this method often requires supplemental manual formation after compaction when the tool surface and resulting structure is contoured. Accordingly, while such methods may be effective at forming relatively small and thin composite structures or composite structures with relatively simple shapes, they may be inefficient when applied to forming large composite structures or composite structures with more complex shapes.

Accordingly, those skilled in the art continue with research and development efforts in the field of composite manufacturing and, more particularly, to the ply by ply manufacture of relatively large and/or relatively complex composite structures.

SUMMARY

Disclosed is a forming apparatus.

In one example, the disclosed forming apparatus includes a frame. The frame defines a vertical axis, a horizontal axis, and a longitudinal axis. A carriage is movably connected to the frame. A first stomp foot is movably connected to the carriage such that it may move along the vertical axis. A first end effector is movably connected to the carriage. The first end effector is controlled by an actuator.

Also disclosed is a method for forming a composite part.

In one example, the disclosed method for forming a composite part includes applying at least one ply of composite material over a forming surface of a forming tool. The method further includes deforming the at least one ply of composite material over the forming surface of the forming tool with a forming apparatus. The forming apparatus includes a frame. The frame defines a vertical axis, a horizontal axis, and a longitudinal axis. A carriage is movably connected to the frame. A first stomp foot is movably connected to the carriage such that it may move along the vertical axis. A first end effector is movably connected to the carriage. The first end effector is controlled by an actuator.

Also disclosed is a system for forming a composite part.

In one example, the disclosed system includes a forming apparatus. The forming apparatus includes a frame. The frame defines a vertical axis, a horizontal axis, and a longitudinal axis. A carriage is movably connected to the frame. A first stomp foot is movably connected to the carriage such that it may move along the vertical axis. A first end effector is movably connected to the carriage. The first end effector is controlled by an actuator. The system further includes a forming tool. The system further includes at least one ply of composite material. The system further includes a ply support feature.

BRIEF DESCRIPTION OF THE DRAWINGS

FIG. 8 is a side view of a stomp foot of the example forming apparatus of FIG. 2.

FIG. 12b is an isometric view of the fastening device of FIG. 12a.

DETAILED DESCRIPTION

Figure 1:
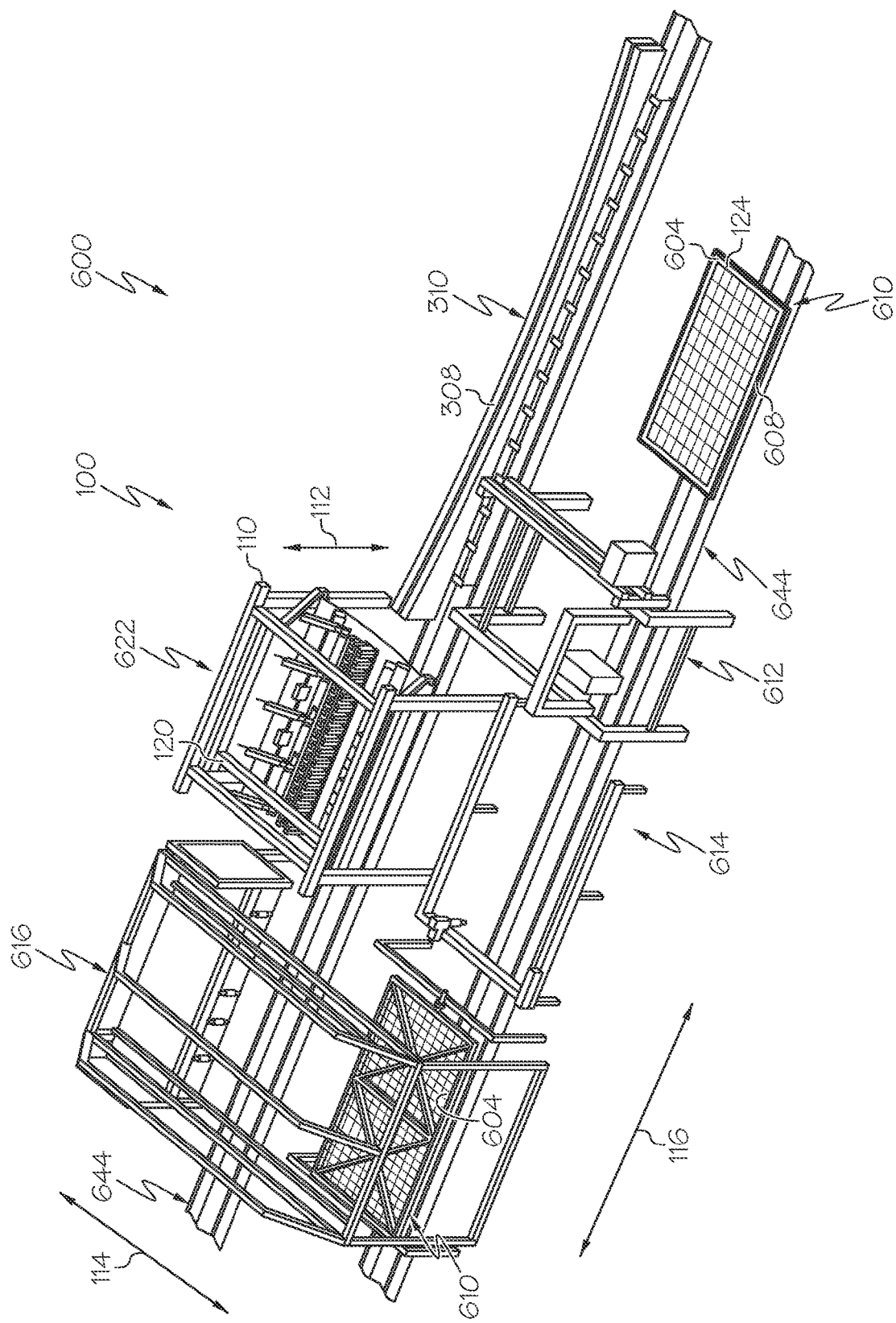
FIG. 1 is an isometric view of an example composite manufacturing system.

The present application is directed to an apparatus, method, and system of ply by ply forming of composite parts. It is to be understood that the disclosure below provides a number of embodiments or examples for implementing different features of various embodiments. Specific examples of components and arrangements are described to simplify the present disclosure. Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Examples of the forming apparatus 100, method 200, and system 300 enable automated forming of a composite part 375 and, more particularly, formation of at least one ply 320 of composite material 325 over a forming tool 310 for manufacture of the composite part 375. Automation of the fabrication process provides a reduction in processing time, a reduction in labor and costs and a reduction of process variations (e.g., human error) that may lead to undesired inconsistencies in the finished composite structure as compared to conventional composite fabrication. The forming apparatus 100, method 200, and system 300 also enable ply-by-ply formation of the composite material 325 to fabricate the composite part 375. Ply-by-ply formation facilitates fabrication of large composite structures, thick composite structures, and/or composite structures with complex shapes. Ply-by-ply formation also provides a reduction in buckling or wrinkling of plies within the composite structure as compared to conventional composite fabrication.

Generally, a composite ply includes a single ply (e.g., one layer of thickness) of composite material 325. The composite material 325 may take the form of any one of various suitable types of composite material 325. In one or more examples, the ply 320 of composite material 325 is formed by laminating multiple courses of unidirectional composite tape, which is pre-impregnated with a resin matrix. Throughout the present disclosure, the phrase "the ply" refers to at least one ply 320 of composite material 325, unless explicitly stated otherwise. The ply 320 may also be referred to as a composite patch or a composite charge.

A composite manufacturing composite manufacturing system 600 includes a plurality of sub-systems, including a stationary forming system 300, that facilitate and correspond to different fabrication operations associated with the manufacture of the composite part 375. The sub-systems of the composite manufacturing composite manufacturing system 600 are interlinked and cooperate to automate at least a portion of the fabrication process. Throughout the present disclosure, the sub-systems of the disclosed composite manufacturing system 600 may be referred to as "systems" themselves or stations in which one or more fabrication operations occur. Among those sub-systems or stations is a system 300 for forming, which is shown and described in detail below.

The examples of the forming apparatus 100, method 200, and system 300 described herein utilize a plurality of semi-automated or automated sub-systems to perform ply-by-ply formation and compaction of individual one or more ply 320 of composite material 325 on the forming tool 310. Ply-by-ply formation refers to the laydown of one or more ply 320 of composite material 325 on the forming tool 310 in a predetermined sequence, and the one or more ply 320 of composite material 325 is compacted onto the forming tool 310 individually after each ply 320 of composite material 325 is laid down, or after more than one ply 320 of composite material 325 had been laid down.

Disclosed is a forming apparatus 100, a method 200, and a system 300 directed to ply by ply forming of a composite part 375 to apply pressure and manipulate plies on a forming tool 310. The forming apparatus 100, method 200, and system 300 utilize a forming tool 310 to define the shape of the composite part 375. The forming tool 310 may be any desired shape including a hat stringer forming tool 312, a spar forming tool 314, and a stringer forming tool 316. The forming apparatus 100 is configured to apply pressure or compaction force 350 evenly across at least one ply 320 of composite material 325 over a forming surface 308 of a forming tool 310. The forming apparatus 100 is further configured to deform 220 the at least one ply 320 of composite material 325 over the forming surface 308 of the forming tool 310 while eliminating any bubbles. The forming apparatus 100 is configured to move along the forming tool 310 at varying speeds, pressures, and angles to accommodate various geometries.

Figure 16:
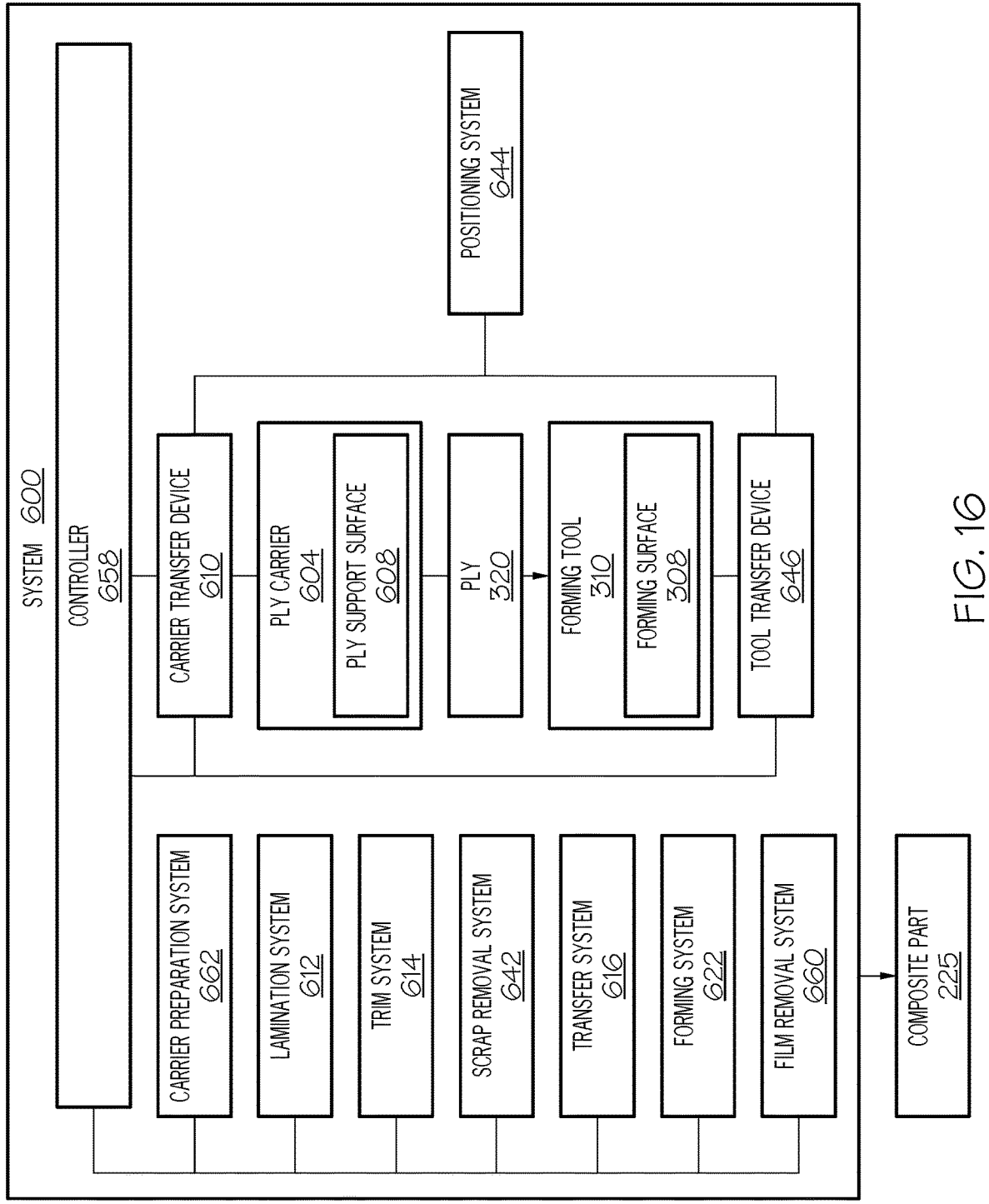
FIG. 16 is a block diagram of a system for manufacturing a composite part.

FIG. 1 and FIG. 16 illustrate an example composite manufacturing composite manufacturing system 600. In an example, the composite manufacturing composite manufacturing system 600 includes a lamination system 612 (e.g., laminating sub-system or station), a transfer system 616 (e.g., transfer sub-system or station) and a forming system 622 (e.g., forming sub-system or station). In one or more examples, the composite manufacturing composite manufacturing system 600 also includes a trim system 614 (e.g., trim sub-system or station) and a scrap removal system 642 (e.g., a scrap removal sub-system of station). In one or more examples, the composite manufacturing composite manufacturing system 600 further includes a film removal system 660 (e.g., film removal sub-system or station). In one or more examples, the composite manufacturing composite manufacturing system 600 additionally includes a carrier preparation system 662 (e.g., carrier preparation sub-system or station). In one or more examples, the composite manufacturing composite manufacturing system 600 also includes a positioning system 644 (e.g., positioning sub-system).

In one or more examples, the composite manufacturing system 600 includes a tool transfer device 646. The tool transfer device 646 is configured to convey the forming tool 310. For example, the tool transfer device 646 includes, or takes the form of, a mobile platform that supports the forming tool 310 and moves the forming tool 310 between the sub-systems of the composite manufacturing system 600 that implement composite structure fabrication operations of the composite manufacturing process.

In an example, the composite manufacturing composite manufacturing system 600 for fabricating a composite part 375 includes a ply carrier 604 comprising a ply support surface 608 configured to support at least one ply 320 of composite material 325. The composite manufacturing composite manufacturing system 600 further includes a carrier transfer device 610 configured to convey the ply carrier 604, a lamination system 612 configured to selectively apply the at least one ply 320 of composite material 325 to the ply support surface 608 of the ply carrier 604, a transfer system 616 configured to remove the ply carrier 604 from the carrier transfer device 610 and to apply the at least one ply 320 of composite material 325 to at least a portion of a forming surface 308 of a forming tool 310, and a forming system 622 configured to form the at least one ply 320 of composite material 325 over the at least a portion of the forming surface 308 of the forming tool 310. The forming system 622 comprises a forming apparatus 100.

Figure 2:
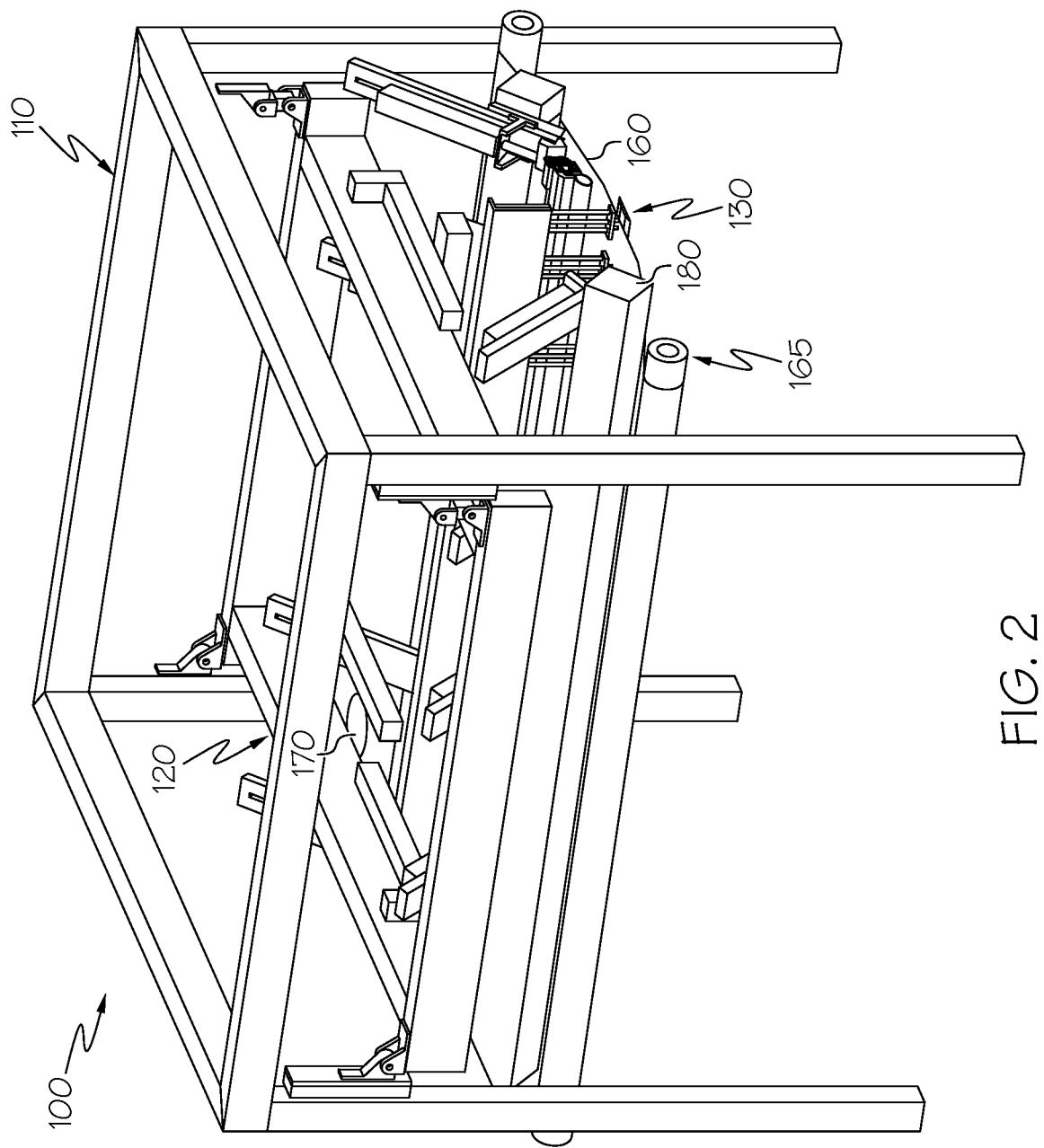
FIG. 2 is an isometric view of an example forming apparatus of the composite manufacturing system of FIG. 1.
Figure 3:
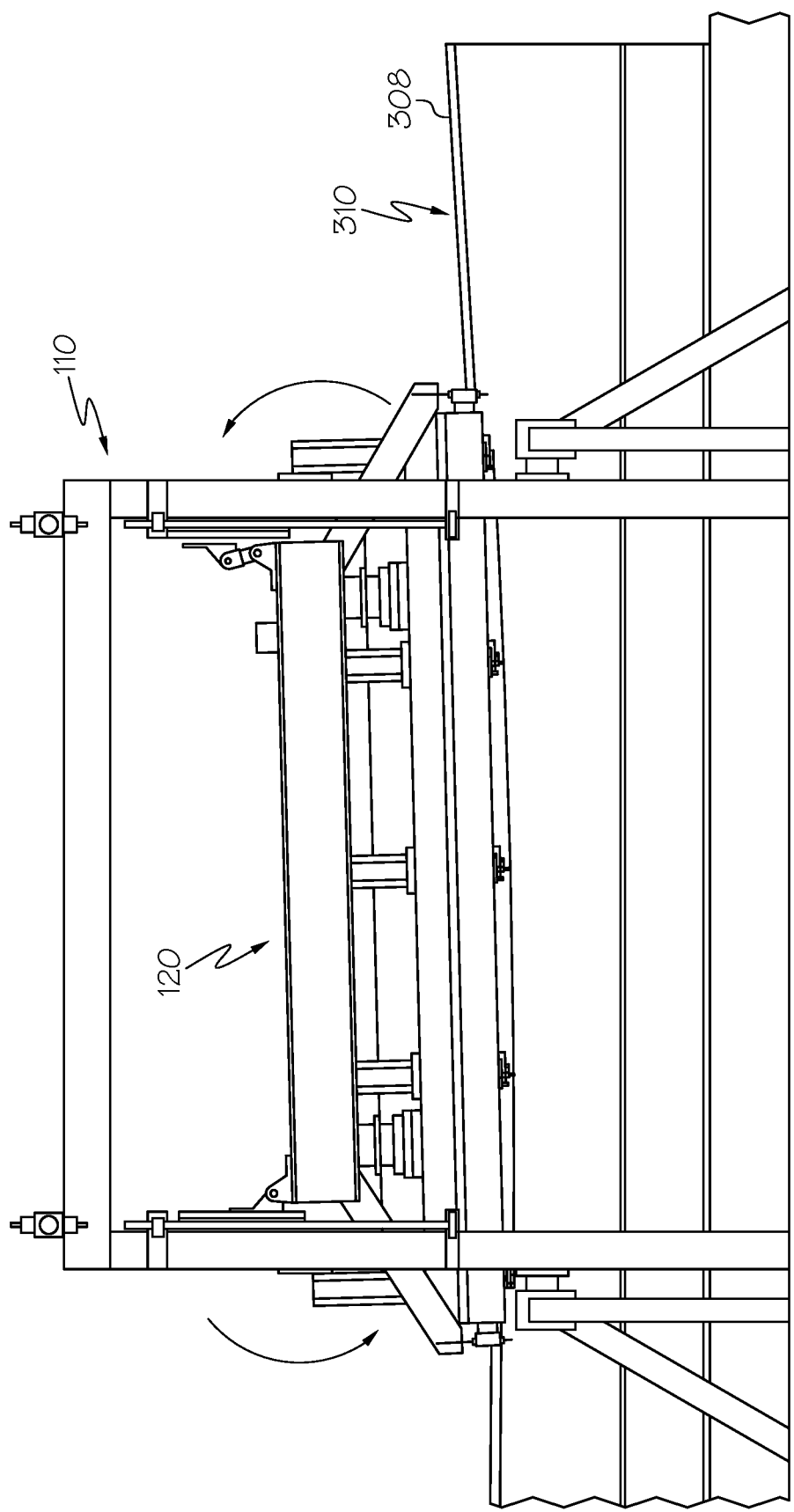
FIG. 3 is a side view of the example forming apparatus of FIG. 2.

FIG. 2 and FIG. 3 illustrate a forming apparatus 100. The forming apparatus 100 is located in the forming system 622. In an example, the forming apparatus 100 includes a frame 110. In an example, the frame 110 is generally rectangular in shape. The frame 110 defines a vertical axis 112, a horizontal axis 114, and a longitudinal axis 116. The frame 110 surrounds a carriage 120 having a shape that is generally the same as the frame 110 but is smaller such that the carriage 120 nests within the frame 110. In an example, the carriage 120 is movably connected to the frame 110 such that it may pivot or rotate along the vertical axis 112 and horizontal axis 114 to accommodate any specific geometry or configuration and achieve a best fit position.

In an example, the forming apparatus 100 includes a first end effector 140. The first end effector 140 is movably connected to the carriage 120. In an example, the first end effector 140 is movable or controlled via an actuator an actuator 147. In an example, the actuator 147 is a pneumatically actuated forming cylinder 147a. in an example, the first end effector 140 is configured to skew along the vertical axis 112. The first end effector 140 may include one or more sensor 410 configured to detect the location of a forming tool 310 along multiple axes including a vertical axis 112, horizontal axis 114, and longitudinal axis 116 for precise forming on a complex forming tool 310. The one or more sensor 410 may be in communication with a controller 400. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140.

Figure 12A:
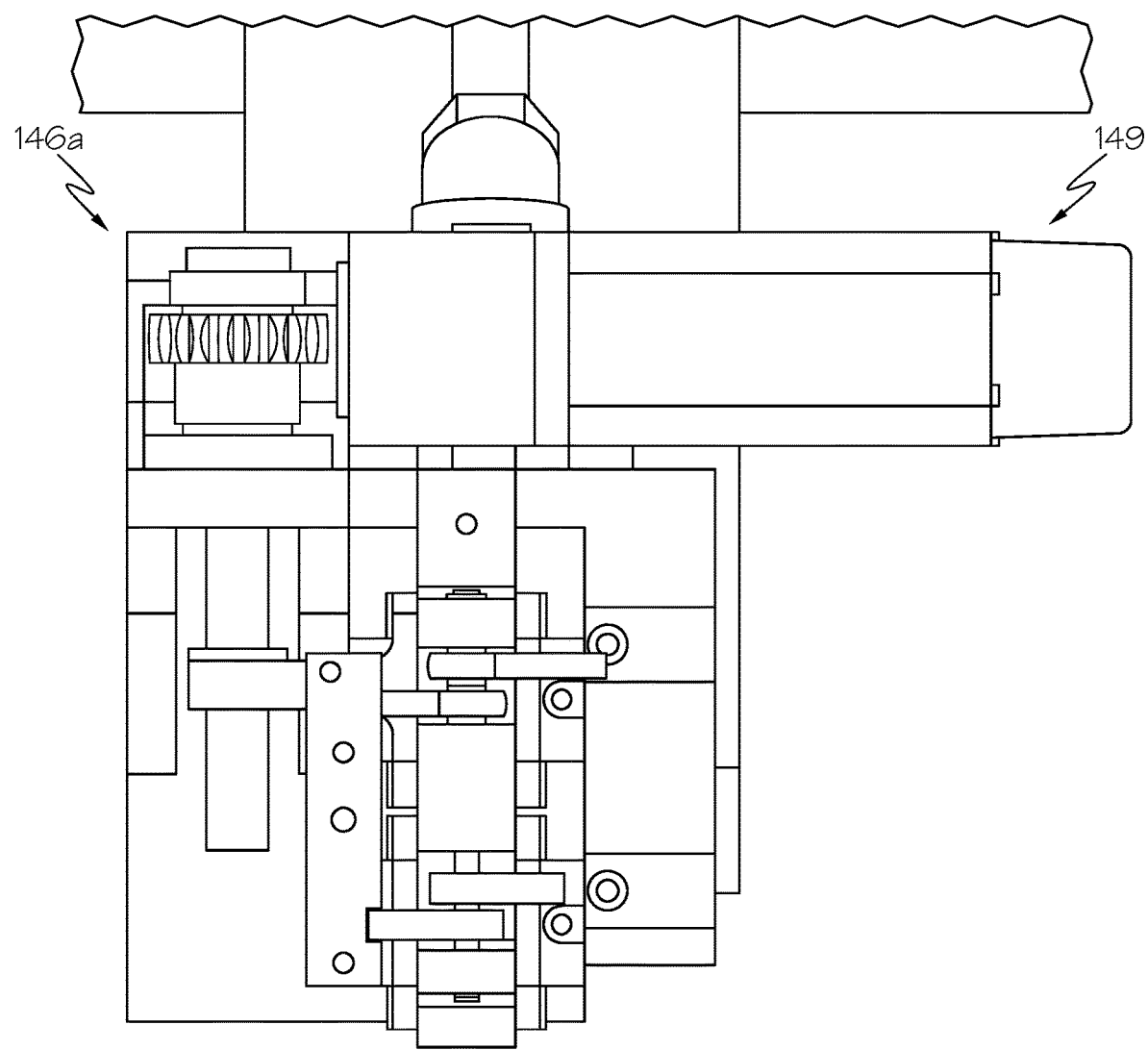
FIG. 12a is a side view of a fastening device of the forming apparatus of FIG. 2.
Figure 12B:
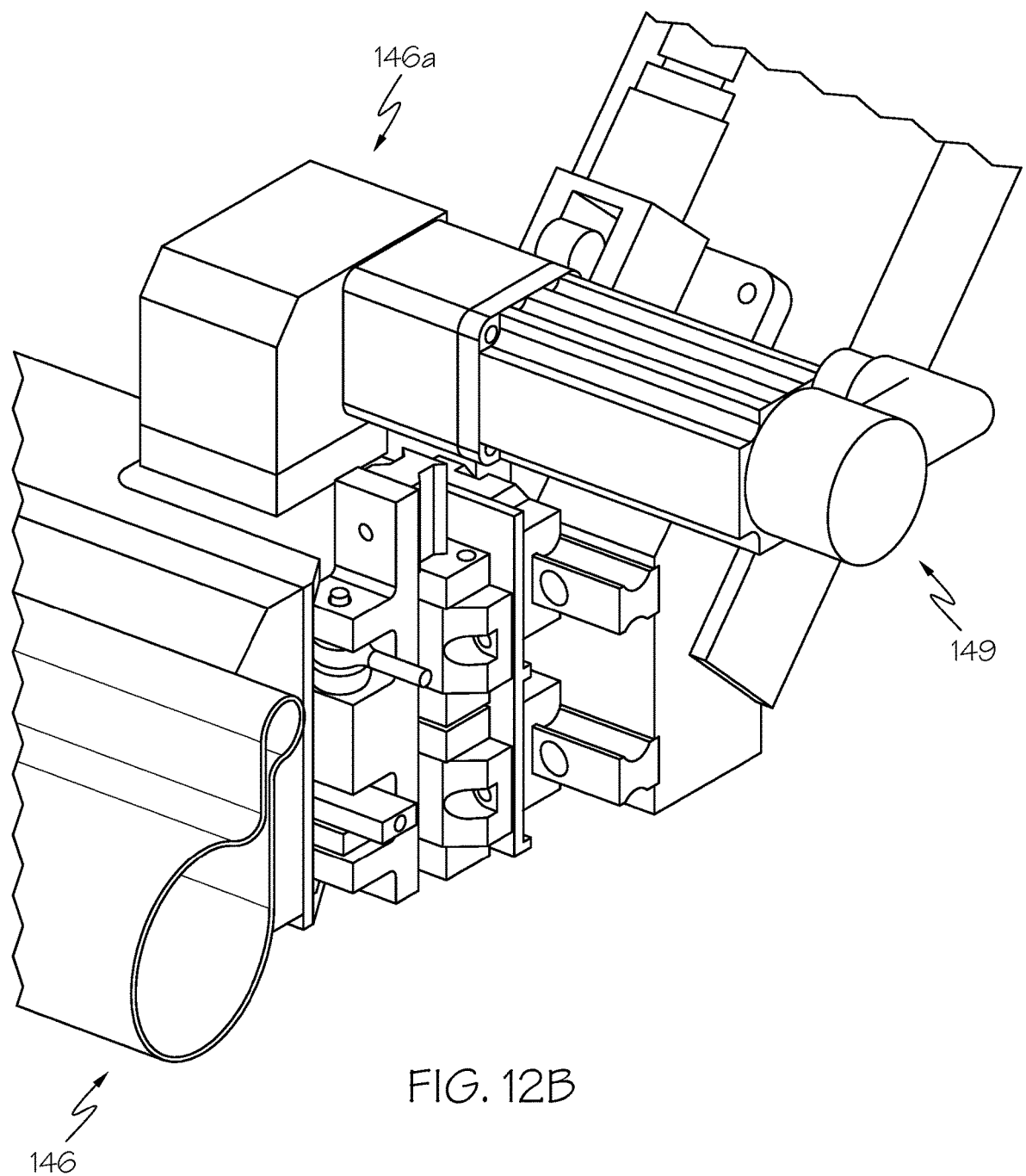
Figure 14:
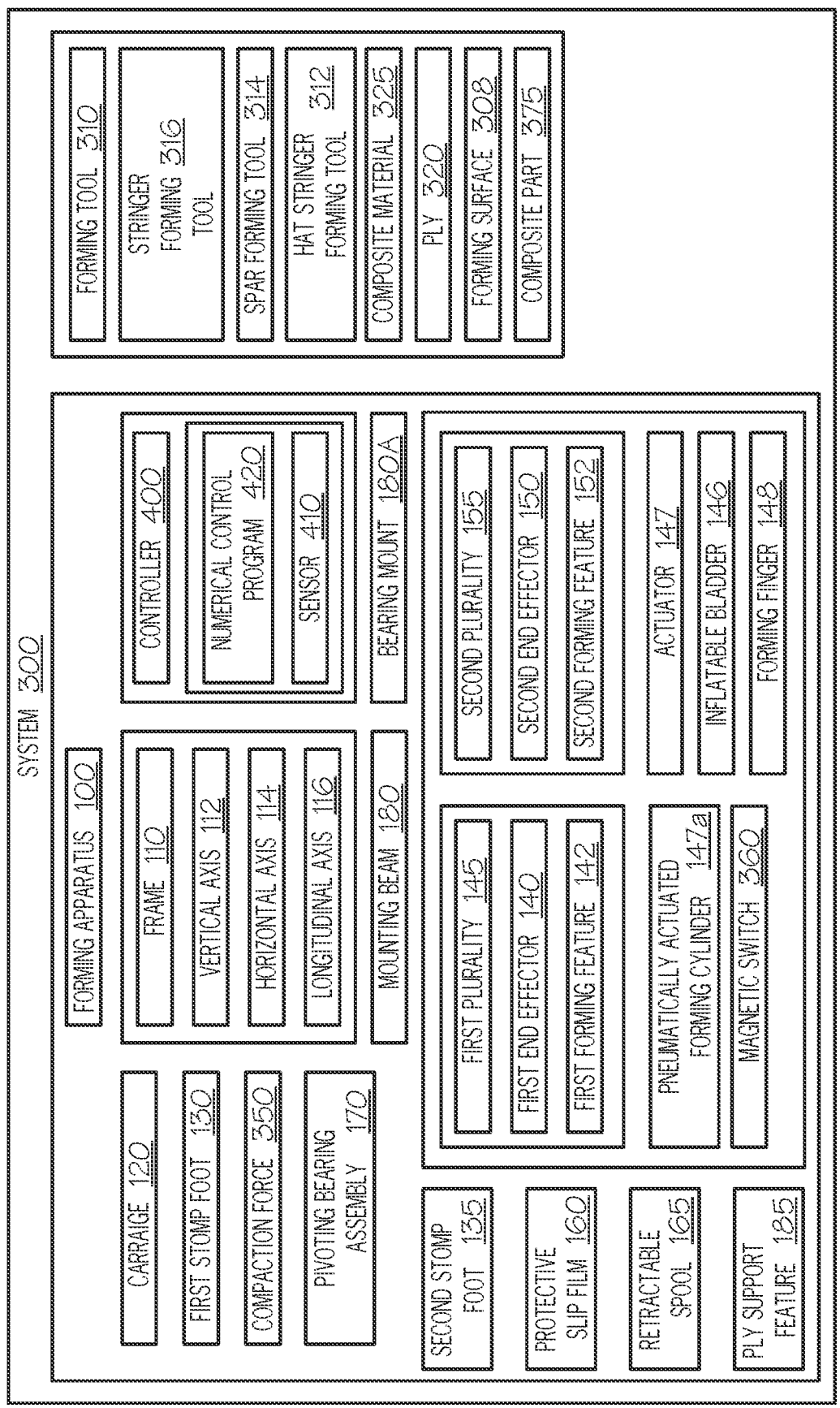
FIG. 14 is a block diagram of a system for forming a composite part.

The first end effector 140 includes a first forming feature 142. In an example, the first forming feature 142 is a forming finger 148 (FIG. 14). In an example, first forming feature 142 is an inflatable bladder 146. The inflatable bladder 146 is configured to passively follow forming tool 310 contours by applying consistent compaction force 350. Compaction force 350 may vary. In an example, compaction force 350 may be up to 20 lbs per linear inch. The inflatable bladder 146 profile or orientation may be manipulated with one or more jacking screw 146a to conform to concave or convex profiles along the forming tool 310 length and to control the radius of the inflatable bladder 146. FIG. 12a and FIG. 12b illustrate jacking screw 146a with respect to the inflatable bladder 146.

Figure 11A:
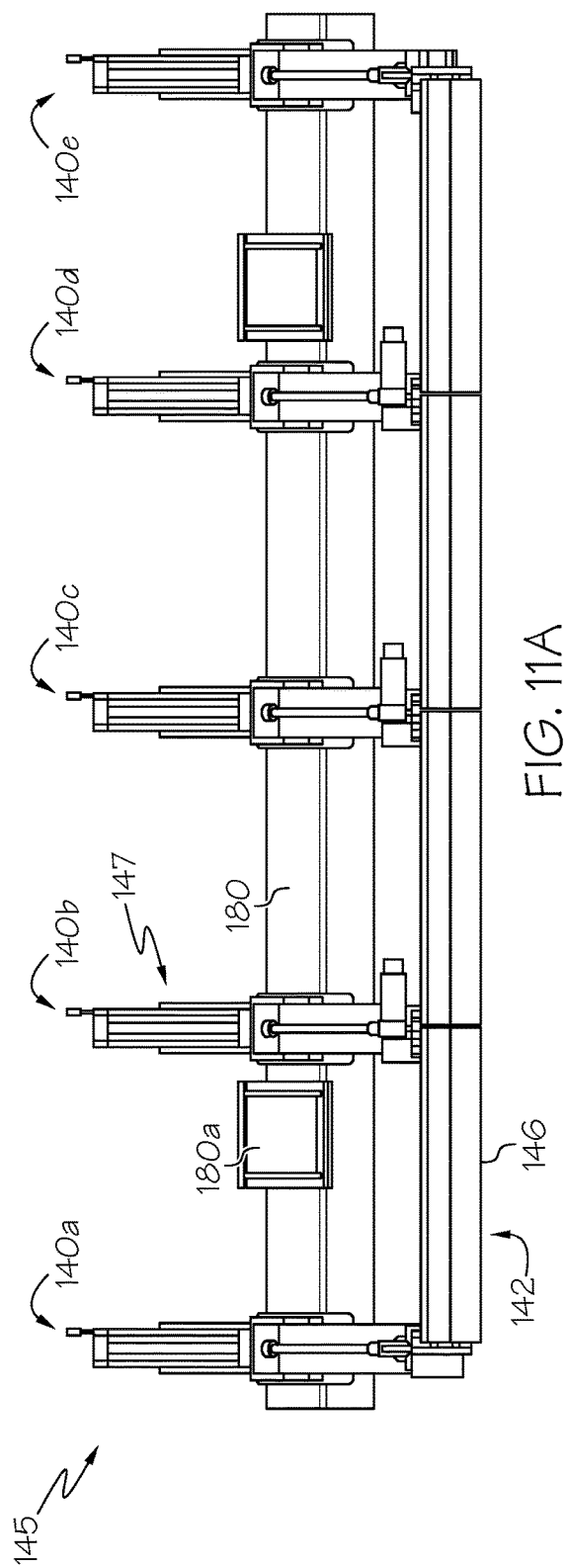
FIG. 11a is a plan view of a plurality of end effectors.

In the exemplary embodiment of FIG. 11a, first end effector A 140a is movable along the horizontal axis 114 to accommodate a concave, convex, or linear configuration. The movement may be passive such that it moved based upon movement of one or more different first end effector 140 of the first plurality 145 of the first end effector 140. The first end effector A 140a is connected to a first forming feature 142 comprising an inflatable bladder 146. Any suitable means of connection and fastening may be used to secure the first forming feature 142 to the first end effector A 140a. In an example, a screw 149 is used to position and secure the forming feature 142 to the first end effector A 140a.

In an example, the first end effector B 140b is movable along the horizontal axis 114 and the vertical axis 112. Movement along the horizontal axis 114 is passive. Movement along the vertical axis 112 is controlled by any suitable means. In an example, the movement of the first end effector B 140b is controlled by an actuator 147. In an example, the actuator 147 is a pneumatically actuated forming cylinder 147a. Movement of the first end effector B 140b may be controlled by a controller 400. The controller 400 is configured to receive data from one or more sensor 410 and analyze that data to control movement of the first end effector B 140b. The controller 400 may utilize one or more numerical control program 420 in conjunction with the data collected from the one or more sensor 410 to determine proper movement and placement of the first end effector B 140b to properly align with a forming tool 310.

In an example, the first end effector C 140c is movable along the horizontal axis 114 and the vertical axis 112. Movement along the vertical axis 112 is controlled by any suitable means. In an example, the movement of the first end effector C 140c is controlled by an actuator 147. In an example, the actuator 147 is a pneumatically actuated forming cylinder 147a. Movement of the first end effector C 140c may be controlled by a controller 400. The controller 400 is configured to receive data from one or more sensor 410 and analyze that data to control movement of the first end effector C 140c. The controller 400 may utilize one or more numerical control program 420 in conjunction with the data collected from the one or more sensor 410 to determine proper movement and placement of the first end effector C 140c to properly align with a forming tool 310.

In an example, the first end effector D 140d is movable along the vertical axis 112. Movement along the horizontal axis 114 is passive. Movement along the vertical axis 112 is controlled by any suitable means. In an example, the movement of the first end effector D 140d is controlled by an actuator 147. In an example, the actuator 147 is a pneumatically actuated forming cylinder 147a. Movement of the first end effector D 140d may be controlled by a controller 400. The controller 400 is configured to receive data from one or more sensor 410 and analyze that data to control movement of the first end effector D 140d. The controller 400 may utilize one or more numerical control program 420 in conjunction with the data collected from the one or more sensor 410 to determine proper movement and placement of the first end effector D 140d to properly align with a forming tool 310.

In an example, first end effector E 140e is movable along the horizontal axis 114 to accommodate a concave, convex, or linear configuration. The movement may be passive such that it moved based upon movement of one or more different first end effector 140 of the first plurality 145 of the first end effector 140. The first end effector E 140e is connected to a first forming feature 142 comprising an inflatable bladder 146. Any suitable means of connection and fastening may be used to secure the first forming feature 142 to the first end effector E 140e.

In an example, the forming apparatus 100 includes a first stomp foot 130. The first stomp foot 130 is movably connected to the carriage 120. The first stomp foot 130 is movable along the vertical axis 112. The first stomp foot 130 may have a flat or a curved design based upon the geometry of the forming tool 310. In an example, the first stomp foot 130 is located adjacent to the first end effector 140. The first stomp foot 130 is configured to move along the vertical axis 112 via any suitable means and is further configured to press one or more ply 320 of composite material 325 onto a forming surface 308 of a forming tool 310 and hold the one or more ply 320 of composite material 325 in place. In an example, the first stomp foot 130 movement is controlled by an actuator 147. In an example, the actuator 147 is a pneumatically actuated forming cylinder 147a. In an example, the first stomp foot 130 movement is controlled by at least one magnetic switch 360 configured to detect travel and location of the first stomp foot 130 with respect to a forming tool 310. The first stomp foot 130 is configured to apply compaction force 350 to a forming tool 310. The applied compaction force 350 may be variable or may be consistent based upon the geometry of the forming tool 310.

Figure 7:
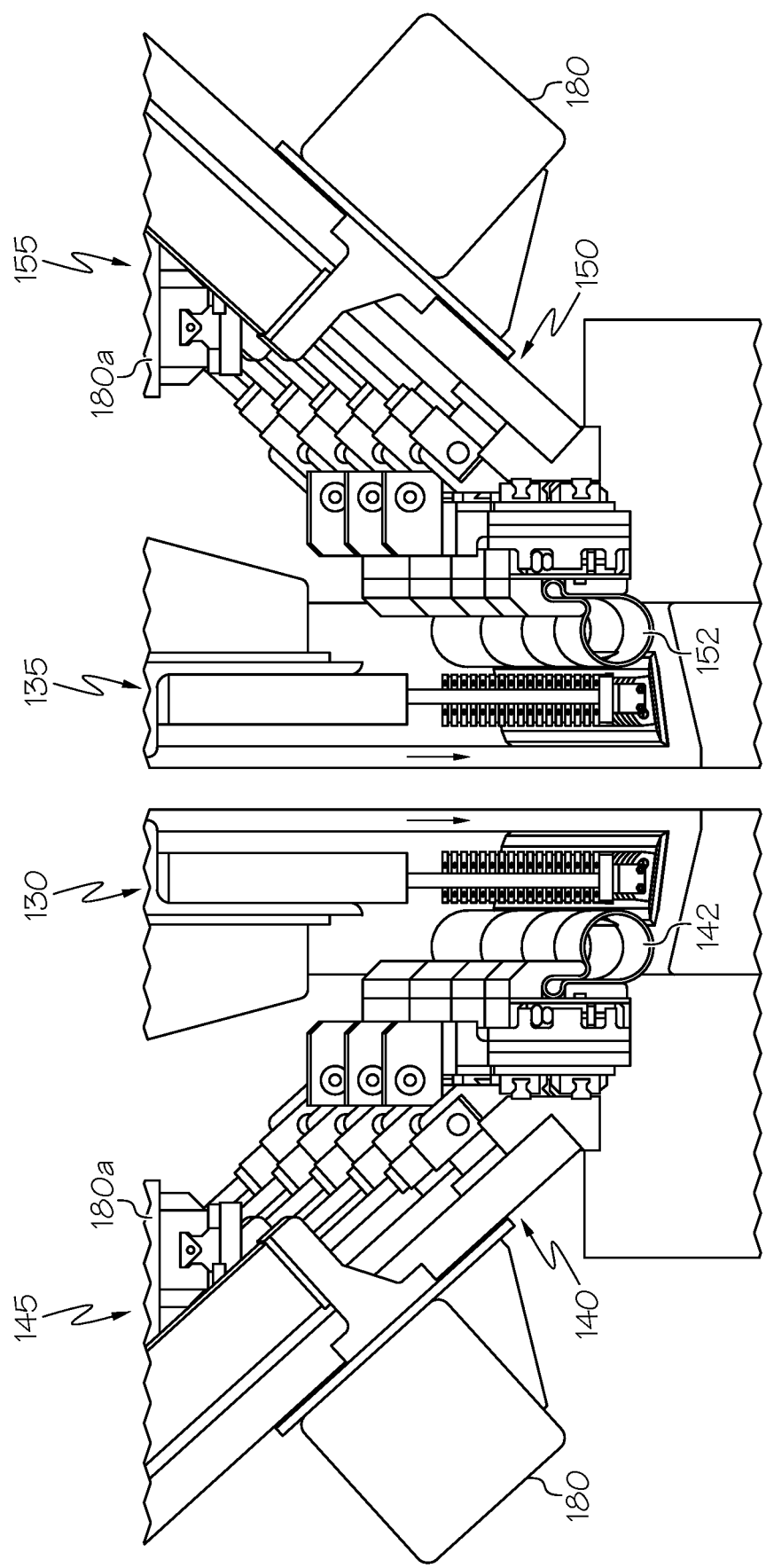
FIG. 7 is an isometric view of an example forming apparatus.
Figure 8:
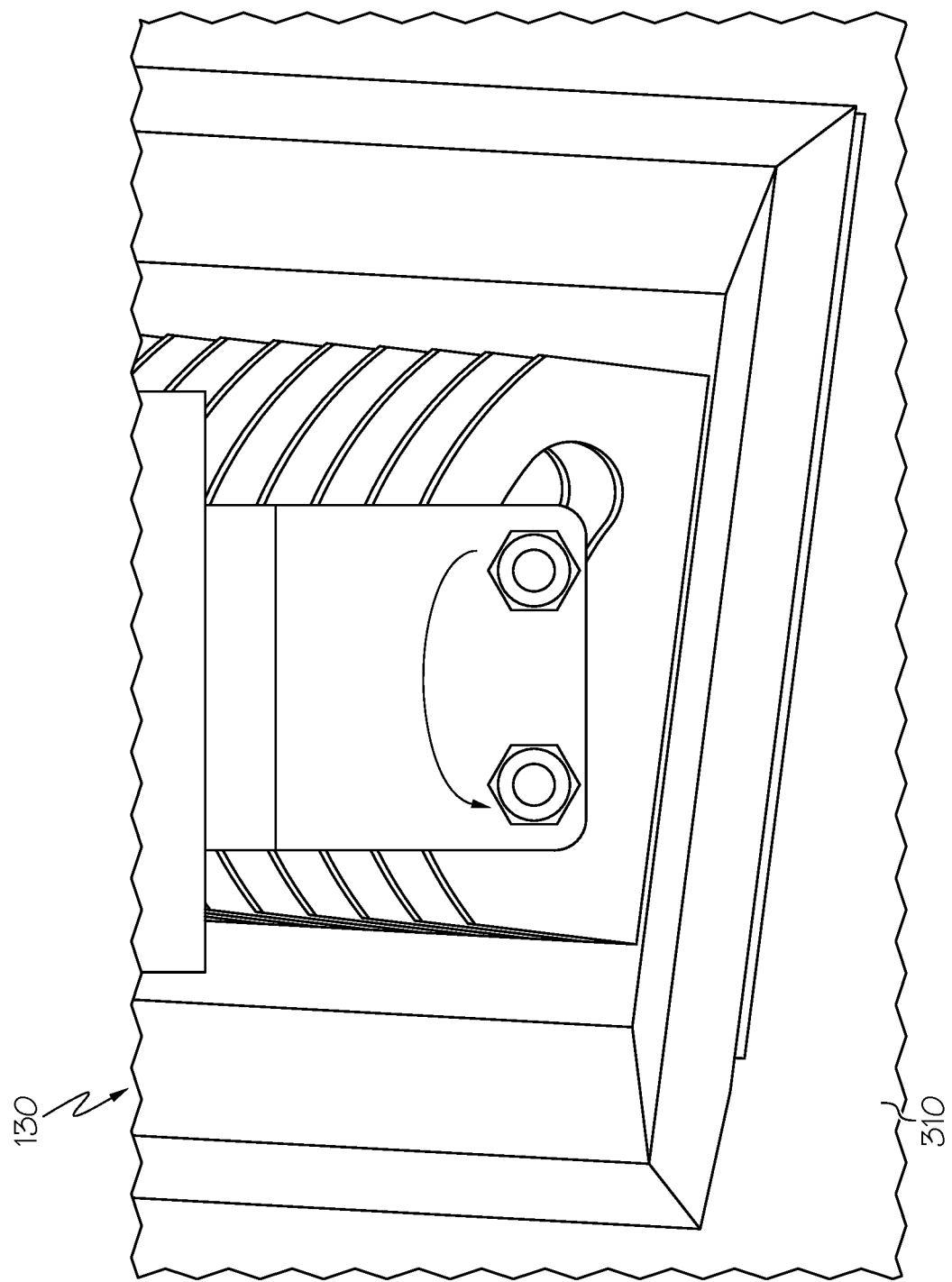
FIG. 8 is an enlarged isometric view of a stomp foot of the example forming apparatus of FIG. 2.
Figure 9:
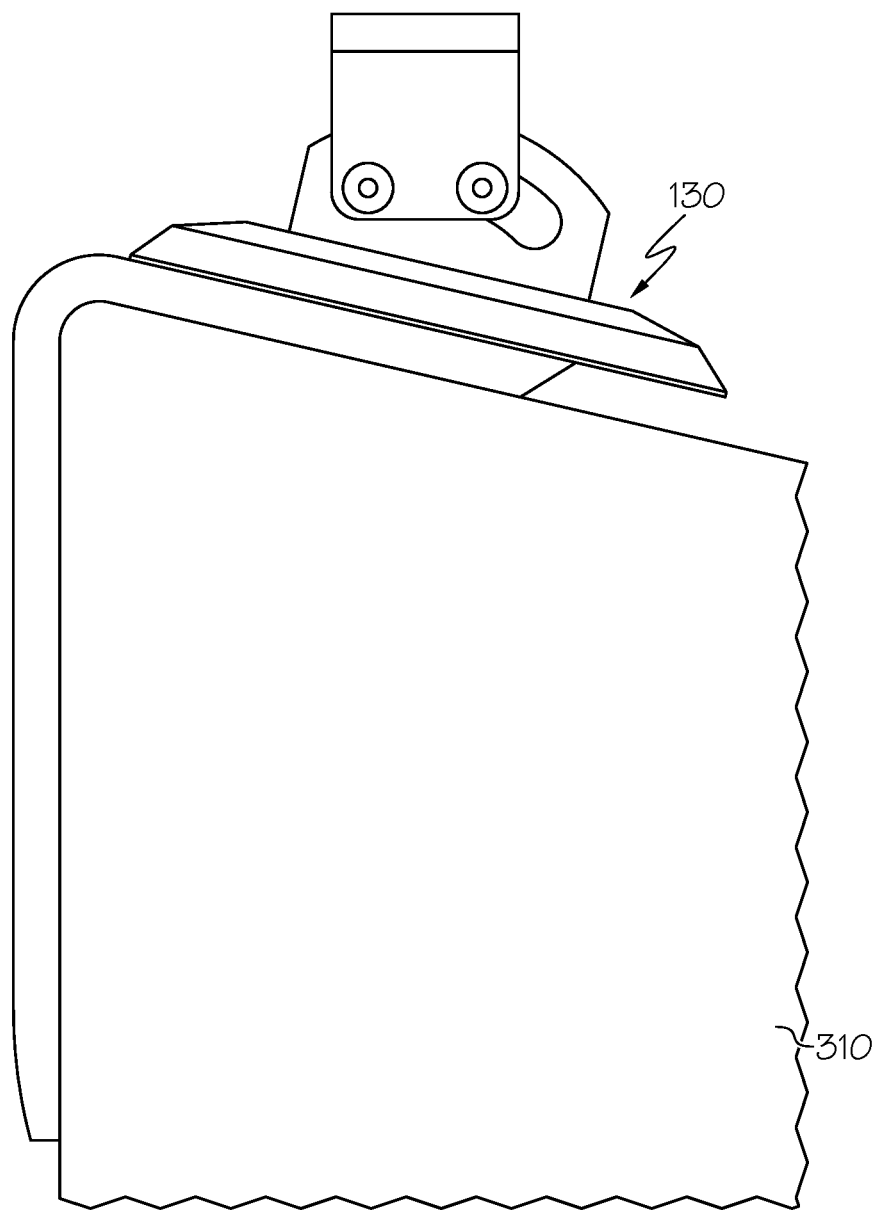
FIG. 9 is a side view of a forming tool and a stomp foot.
Figure 10:
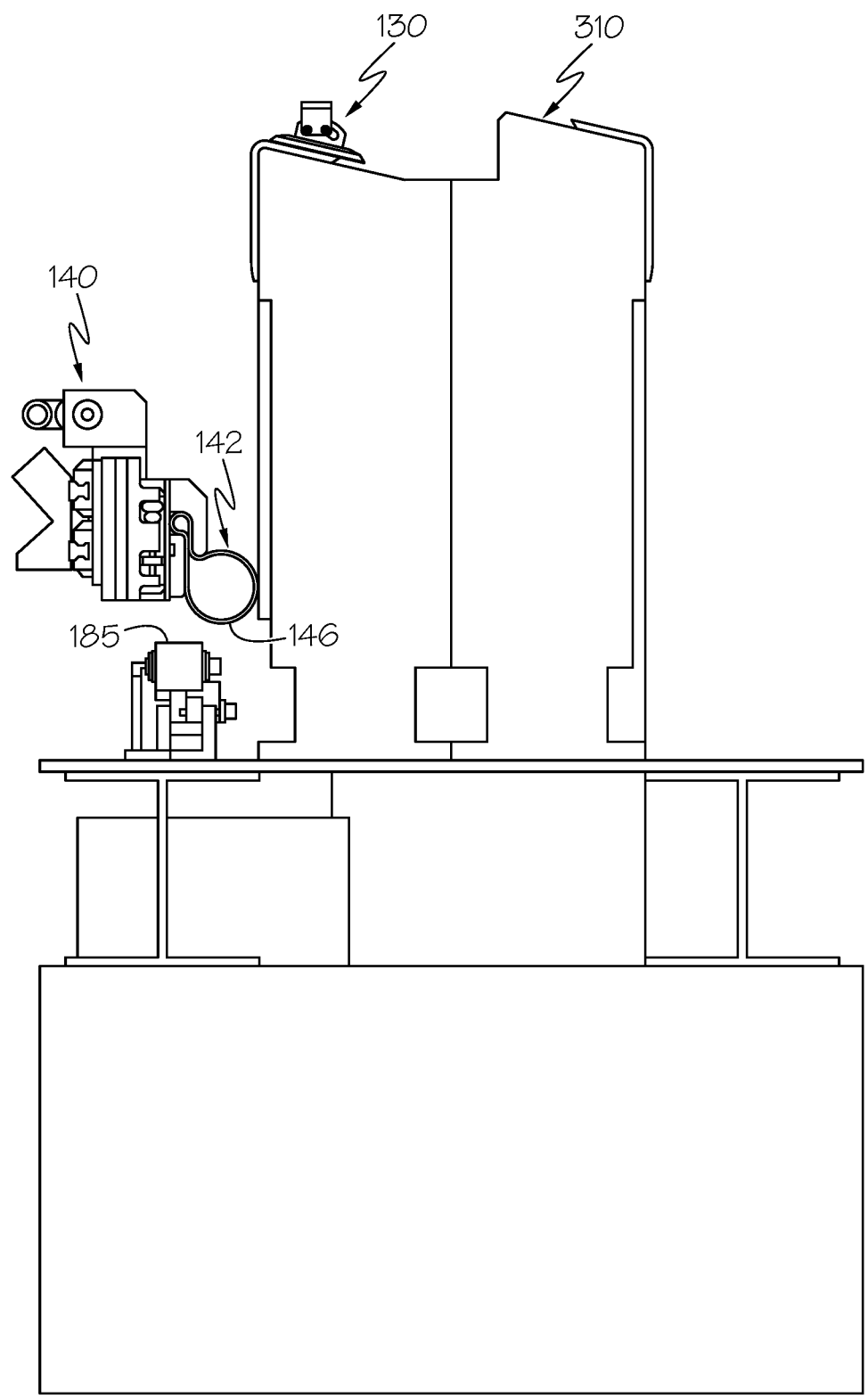
FIG. 10 is a side view of a forming tool on a tool transfer device.

FIG. 7 and FIG. 8 illustrate an exemplary embodiment of the first stomp foot 130. In an example, the first stomp foot 130 is configured to move along the vertical axis 112 and apply compaction force 350. In an example, the first stomp foot 130 is configured to pivotably move along the horizontal axis 114. The first stomp foot 130 may have a generally flat bottom surface or generally curved bottom surface based upon on the geometry of the forming tool 310. FIG. 9 illustrates the first stomp foot 130 pivoting along the vertical axis 112 to accommodate forming tool 310 geometry. This configuration is ideal for outside forming of a stinger forming tool 316. FIG. 10 illustrates the first stomp foot 130 positioned on the top surface of the forming tool 310 and first end effector 140 positioned lower along the vertical axis 112 along the outside surface of the forming tool 310. The first stomp foot 130 is in communication with a controller 400 that may control the magnetic switch 360 and actuator 147 based upon one or more numerical control program 420 and data collected from one or more sensor 410.

The forming apparatus 100 may include more than one pivoting bearing assembly 170 that is movably connected to the carriage 120 and a mounting beam 180 via a bearing mount 180a. The pivoting bearing assembly 170 is configured to have linear and radial configurations. The pivoting bearing assembly 170 allows for adjustments in yaw angle with respect to the first plurality 145 of first end effector 140 and second plurality 155 of the second end effector 150. Adjustments in yaw angle allow for uniform compaction force 350 across a forming tool 310, and particularly to a spar forming tool 314.

Figure 4:
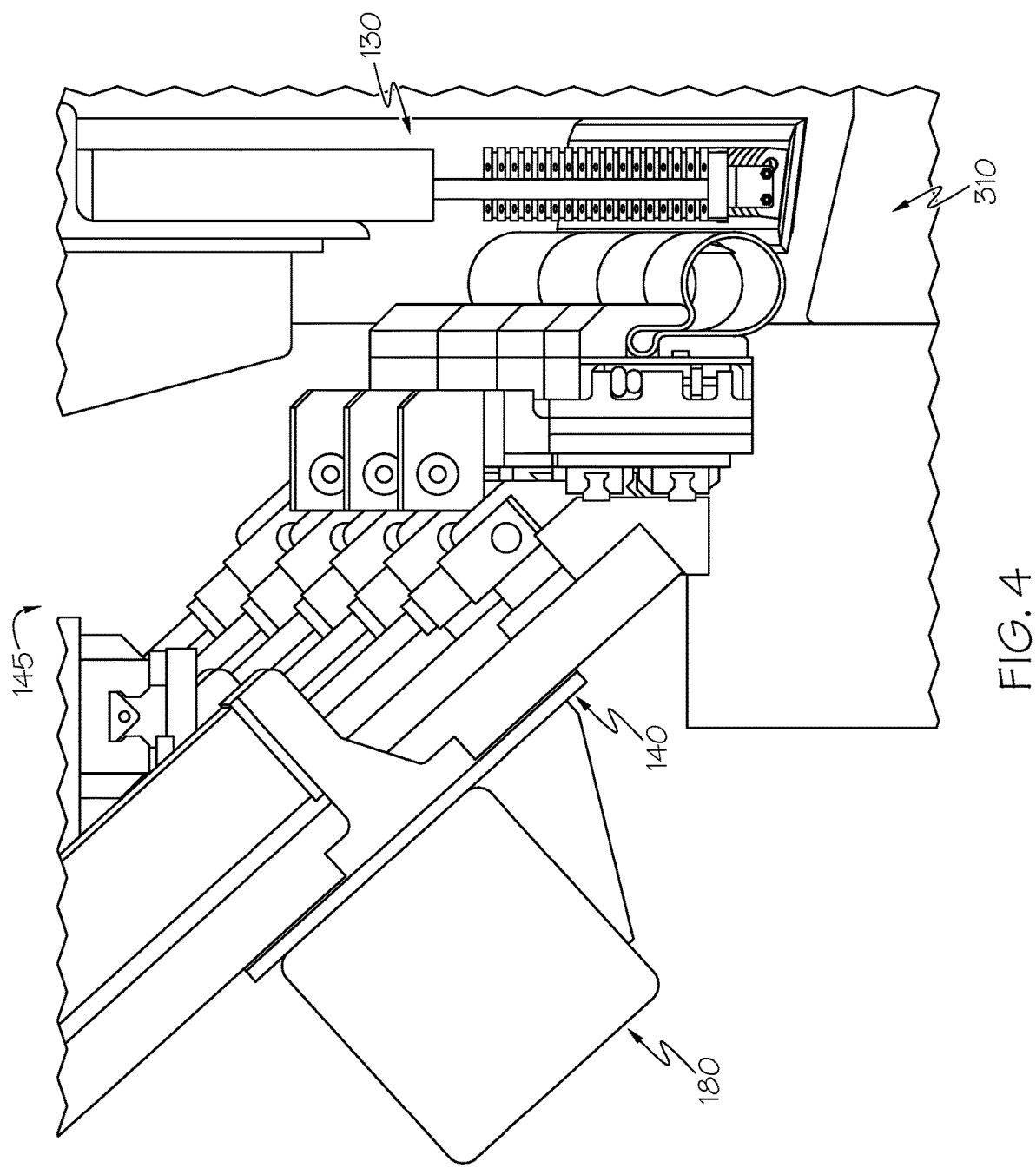
FIG. 4 is an isometric view of a plurality of end effectors of the example forming apparatus of FIG. 2
Figure 5:
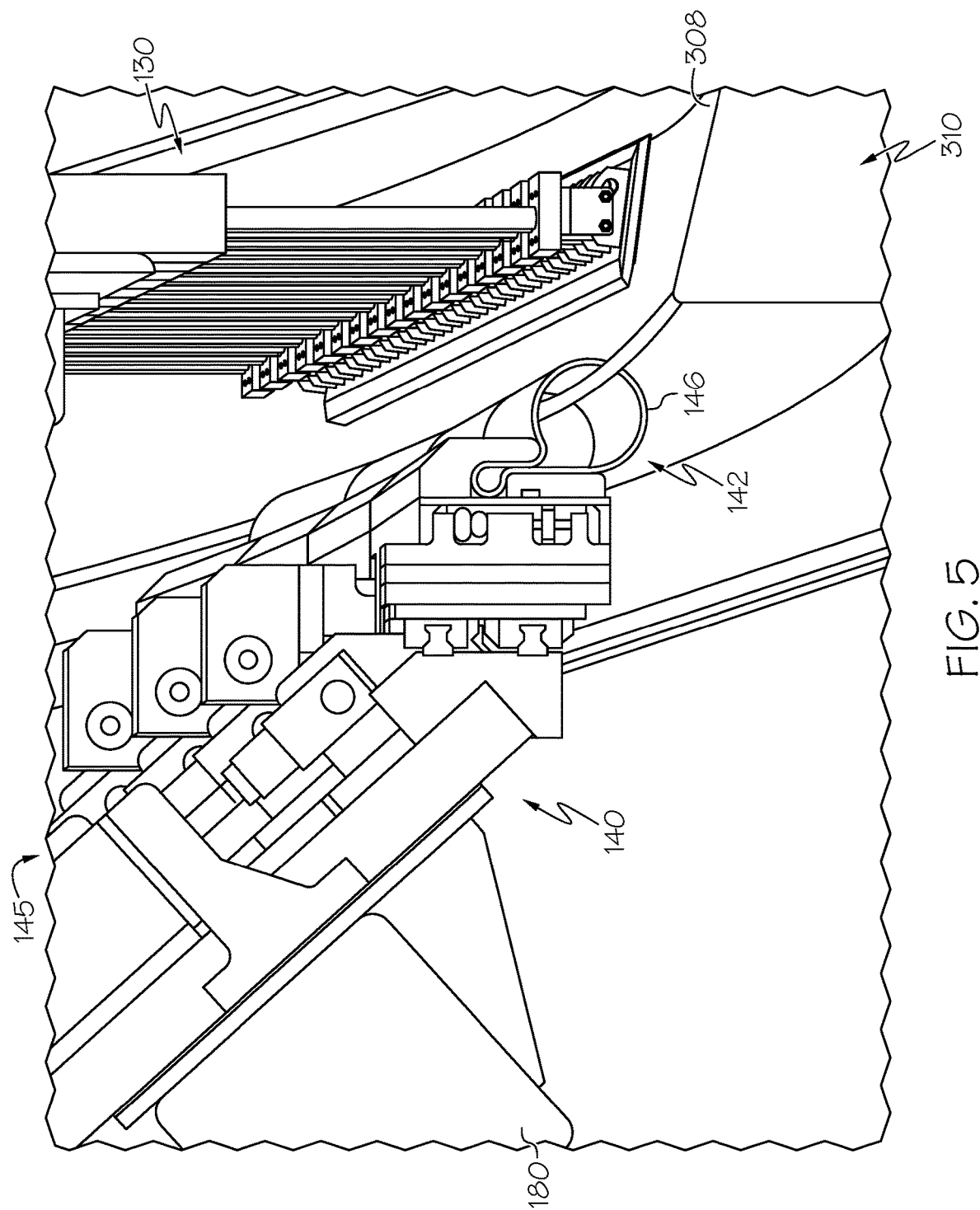
FIG. 5 is an isometric view of a stomp foot of the example forming apparatus of FIG. 2.
Figure 6:
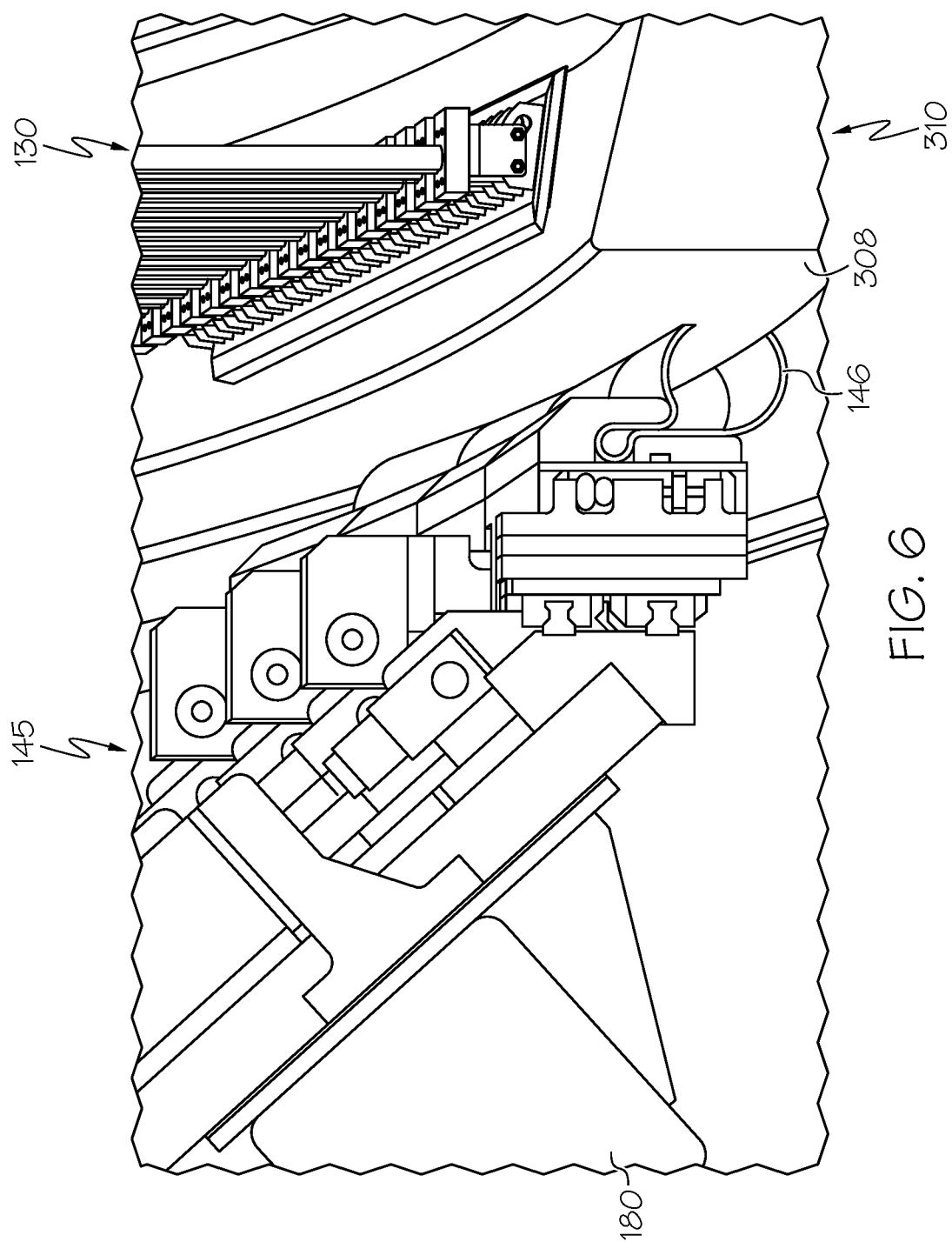
FIG. 6 is an enlarged isometric view of the example forming apparatus of FIG. 2.

FIG. 4, FIG. 5, and FIG. 6 illustrate a forming apparatus 100 having a first plurality 145 of the first end effector 140. In an example, the first plurality 145 of the first end effector 140 extends along the longitudinal axis 116 of the forming apparatus 100. In an example, each individual first end effector 140 of the first plurality 145 of the first end effector 140 includes a first forming feature 142. In an example, each forming feature 142 of the first plurality 145 comprises an inflatable bladder 146 that collectively form a convex, concave, or generally linear shape based upon the geometry of the forming tool 310. In an example, the inflatable bladder 146 abuts the first stomp foot 130. In an example, each individual first end effector 140 of the first plurality 145 of the first end effector 140 is independently movable. This arrangement allows for the first plurality 145 of the first end effector 140 to form a convex, concave, or linear configuration with each first forming feature 142.

FIG. 5 illustrates the first plurality 145 of the first end effector 140 moved to the edge of the forming tool 310. In an example, the forming tool 310 is a stringer forming tool 316. The forming tool 310 may be positioned on one or more movable form block. The one or more movable form block may be configured to move along the horizontal axis 114.

FIG. 6 illustrates the first plurality 145 of the first end effector 140 moved to the side of the forming tool 310 along the outside edge. As illustrated in FIG. 6, the forming tool 310 is a stringer forming tool 316. The stringer forming tool 316 requires different first forming feature 142 configurations than a hat stringer forming tool 312 or spar forming tool 314 requires.

In an example, the forming apparatus 100 includes a second end effector 150. The second end effector 150 is movably connected to the carriage 120, said second end effector 150 is laterally opposed from said first end effector 140 relative to the longitudinal axis 116 such that it mirrors the configuration of the first end effector 140. In an example, the second end effector 150 is movable or controlled via an actuator an actuator 147. In an example, the actuator 147 is a pneumatically actuated forming cylinder 147a. In an example, the second end effector 150 is configured to skew along the vertical axis 112. The second end effector 150 may include one or more sensor 410 configured to detect the location of a forming tool 310 along multiple axes including a vertical axis 112, horizontal axis 114, and longitudinal axis 116 for precise forming on a complex forming tool 310. The one or more sensor 410 may be in communication with a controller 400. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140.

The second end effector 150 includes a second forming feature 152. In an example, the second forming feature 152 is a forming finger 148. In an example, second forming feature 152 is an inflatable bladder 146. The inflatable bladder 146 is configured to passively follow forming tool 310 contours by applying consistent compaction force 350. Compaction force 350 may vary. In an example, compaction force 350 may be up to 20 lbs per linear inch. The inflatable bladder 146 profile or orientation may be manipulated with one or more jacking screw 146a to conform to concave or convex profiles along the forming tool 310 length and to control the radius of the inflatable bladder 146. FIG. 12a and FIG. 12b illustrate jacking screw 146a with respect to the inflatable bladder 146.

FIG. 7 illustrates a first plurality 145 of the first end effector 140 and a second plurality 155 of the second end effector 150. In an example, the forming apparatus 100 comprises a second plurality 155 of the second end effector 150. The second plurality 155 of the second end effector 150 extends along the longitudinal axis 116 and is laterally opposed from the first plurality 145 of the first end effector 140. In an example, each individual second end effector 150 of the second plurality 155 of the second end effector 150 is independently movable. This arrangement allows for the second plurality 155 of the second end effector 150 to form a convex, concave, or linear configuration. In the exemplary embodiment of FIG. 11b, the second plurality 155 of the second end effector 150 includes five of the second end effector 150 that are movably connected to a mounting beam 180. The mounting beam 180 is movably connected to the carriage 120 such that it may move along the vertical axis 112 and horizontal axis 114 in accordance with the shape and geometry of a forming tool 310.

Figure 11B:
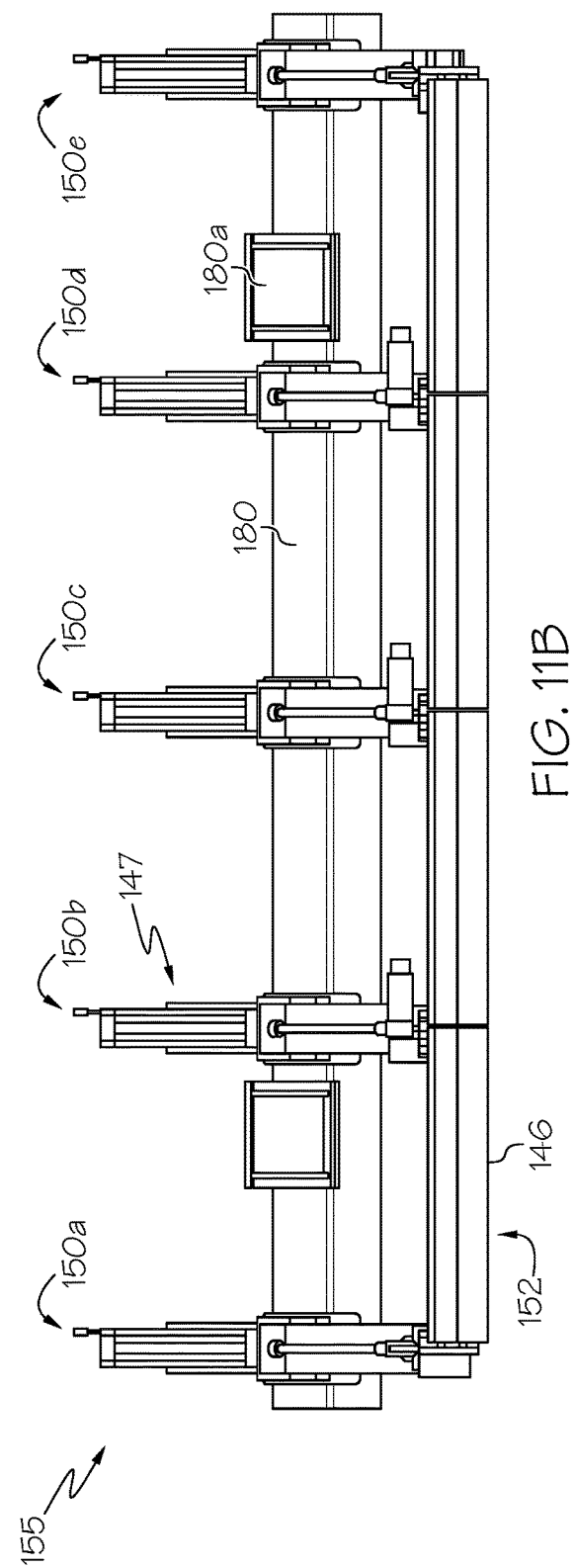
FIG. 11b is a plan view of a plurality of end effectors.

In the exemplary embodiment of FIG. 11b, second end effector A 150a is movable along the horizontal axis 114 to accommodate a concave, convex, or linear configuration. The movement may be passive such that it moved based upon movement of one or more different second end effector 150 of the second plurality 155 of the second end effector 150. The second end effector A 150a is connected to a second forming feature 152 comprising an inflatable bladder 146. Any suitable means of connection and fastening may be used to secure the second forming feature 152 to the second end effector A 150a. In an example, a screw 149 is used to position and secure the second forming feature 152 to the second end effector A 150a.

In an example, the second end effector B 150b is movable along the horizontal axis 114 and the vertical axis 112. Movement along the horizontal axis 114 is passive. Movement along the vertical axis 112 is controlled by any suitable means. In an example, the movement of the second end effector B 150b is controlled by an actuator 147. In an example, the actuator 147 is a pneumatically actuated forming cylinder 147a. Movement of the second end effector B 150b may be controlled by a controller 400. The controller 400 is configured to receive data from one or more sensor 410 and analyze that data to control movement of the second end effector B 150b. The controller 400 may utilize one or more numerical control program 420 in conjunction with the data collected from the one or more sensor 410 to determine proper movement and placement of the second end effector B 150b to properly align with a forming tool 310.

In an example, the second end effector C 150c is movable along the horizontal axis 114 and the vertical axis 112. Movement along the vertical axis 112 is controlled by any suitable means. In an example, the movement of the second end effector C 150c is controlled by an actuator 147. In an example, the actuator 147 is a pneumatically actuated forming cylinder 147a. Movement of the second end effector C 150c may be controlled by a controller 400. The controller 400 is configured to receive data from one or more sensor 410 and analyze that data to control movement of the second end effector C 150c. The controller 400 may utilize one or more numerical control program 420 in conjunction with the data collected from the one or more sensor 410 to determine proper movement and placement of the second end effector C 150c to properly align with a forming tool 310.

In an example, the second end effector D 150d is movable along the vertical axis 112. Movement along the horizontal axis 114 is passive. Movement along the vertical axis 112 is controlled by any suitable means. In an example, the movement of the second end effector D 150d is controlled by an actuator 147. In an example, the actuator 147 is a pneumatically actuated forming cylinder 147a. Movement of the second end effector D 150d may be controlled by a controller 400. The controller 400 is configured to receive data from one or more sensor 410 and analyze that data to control movement of the second end effector D 150d. The controller 400 may utilize one or more numerical control program 420 in conjunction with the data collected from the one or more sensor 410 to determine proper movement and placement of the second end effector D 150d to properly align with a forming tool 310.

In an example, second end effector E 150e is movable along the horizontal axis 114 to accommodate a concave, convex, or linear configuration. The movement may be passive such that it moved based upon movement of one or more different second end effector 150 of the second plurality 155 of the second end effector 150. The second end effector E 150e is connected to a second forming feature 152 comprising an inflatable bladder 146. Any suitable means of connection and fastening may be used to secure the second forming feature 152 to the second end effector E 150e.

FIG. 7 illustrates a forming apparatus 100 having a first stomp foot 130 and a second stomp foot 135. In an example, the forming apparatus 100 includes a second stomp foot 135. The second stomp foot 135 is movably connected to the carriage 120. In an example, the second stomp foot 135 is located between the first stomp foot 130 and the second end effector 150. The first stomp foot 130 is movable along the vertical axis 112. The first stomp foot 130 may have a flat or a curved design based upon the geometry of the forming tool 310. In an example, the first stomp foot 130 is located adjacent to the first end effector 140. The second stomp foot 135 is configured to move along the vertical axis 112 via any suitable means and is further configured to press one or more ply 320 of composite material 325 onto a forming surface 308 of a forming tool 310 and hold the one or more ply 320 of composite material 325 in place. In an example, the second stomp foot 135 movement is controlled by an actuator 147. In an example, the actuator 147 is a pneumatically actuated forming cylinder 147a. In an example, the second stomp foot 135 movement is controlled by at least one magnetic switch 360 configured to detect travel and location of the second stomp foot 135 with respect to a forming tool 310. The second stomp foot 135 is configured to apply compaction force 350 to a forming tool 310. The applied compaction force 350 may be variable or may be consistent based upon the geometry of the forming tool 310. The second stomp foot 135 is in communication with a controller 400 that may control the magnetic switch 360 and actuator 147 based upon one or more numerical control program 420 and data collected from one or more sensor 410.

In an example, the forming apparatus 100 comprises a ply support feature 185. Ply support feature 185 may be located below the first stomp foot 130 and the second stomp foot 135. Ply support feature 185 may be configured to support one or more ply 320 of composite material 325 prior to initiation of forming. Ply support feature 185 may further be configured to prevent the one or more ply 320 of composite material 325 from wrinkling prior to or during forming. The ply support feature 185 may be mechanical or may be air driven. In an example, the ply support feature 185 is an air knife.

In an example, the forming apparatus 100 includes a first plurality 145 of the first end effector 140 and a second plurality 155 of the second end effector 150. The first plurality 145 of the first end effector 140 and the second plurality 155 of the second end effector 150 are laterally opposed from each other with a first stomp foot 130 and a second stomp foot 135 located between.

The configuration of the first plurality 145 of the first end effector 140 and the second plurality 155 of the second end effector 150 to accommodate a stinger forming tool 316 is illustrated in FIG. 20a and FIG. 20b. In this example, the first plurality 145 of the first end effector 140 is convex and the second plurality 155 of the second end effector 150 is concave. FIGS. 15a-15d illustrate various concave and convex configurations that the first plurality 145 of the first end effector 140 and the second plurality 155 of the second end effector 150 can achieve to match the geometry of a forming tool 310. The first forming feature 142 and second forming feature 152 are an inflatable bladder 146.

FIG. 2 illustrates an exemplary embodiment of the forming apparatus 100 comprising a protective slip film 160. The protective slip film 160 may be of any suitable material including a polymer material such as PTFE or FEP. The protective slip film 160 is connected to at least one retractable spool 165. The retractable spool 165 is configured to provide constant tension to the protective slip film 160. The protective slip film 160 is advantageous in prevention of bunching of composite material 325 material during the forming process.

Figure 13:
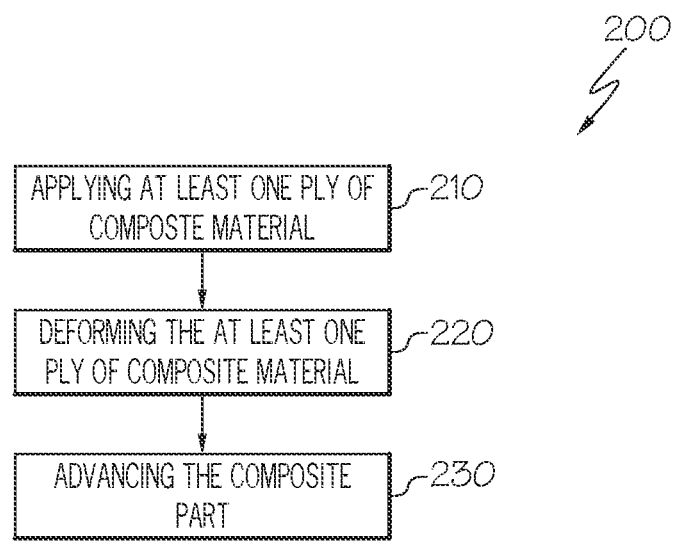
FIG. 13 is a flowchart of a method of forming a composite part.

FIG. 13 illustrates an exemplary method 200. Disclosed is a method 200 for forming a composite part 375. The method 200 comprises applying 210 at least one ply 320 of composite material 325 over a forming surface 308 of a forming tool 310. The method 200 further comprises deforming 220 the at least one ply 320 of composite material 325 over the forming surface 308 of the forming tool 310 with a forming apparatus 100. The method 200 further comprises advancing 230 the composite part 375 to a subsequent process. In an example, the forming apparatus 100 of the method 200 includes a frame 110. In an example, the frame 110 is generally rectangular in shape. The frame 110 defines a vertical axis 112, a horizontal axis 114, and a longitudinal axis 116. The frame 110 surrounds a carriage 120 having a shape that is generally the same as the frame 110 but is smaller such that the carriage 120 nests within the frame 110. In an example, the carriage 120 is movably connected to the frame 110 such that it may pivot or rotate along the vertical axis 112 and horizontal axis 114 to accommodate any specific geometry or configuration and achieve a best fit position.

In an example, the forming apparatus 100 of the method 200 includes a first end effector 140. The first end effector 140 is movably connected to the carriage 120. In an example, the first end effector 140 is movable or controlled via an actuator an actuator 147. In an example, the actuator 147 is a pneumatically actuated forming cylinder 147a. in an example, the first end effector 140 is configured to skew along the vertical axis 112. The first end effector 140 may include one or more sensor 410 configured to detect the location of a forming tool 310 along multiple axes including a vertical axis 112, horizontal axis 114, and longitudinal axis 116 for precise forming on a complex forming tool 310. The one or more sensor 410 may be in communication with a controller 400. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140.

The first end effector 140 includes a first forming feature 142. In an example, the first forming feature 142 is a forming finger 148. In an example, first forming feature 142 is an inflatable bladder 146. The inflatable bladder 146 is configured to passively follow forming tool 310 contours by applying consistent compaction force 350. Compaction force 350 may vary. In an example, compaction force 350 may be up to 20 lbs per linear inch. The inflatable bladder 146 profile or orientation may be manipulated with one or more jacking screw 146a to conform to concave or convex profiles along the forming tool 310 length and to control the radius of the inflatable bladder 146. FIG. 12a and FIG. 12b illustrate jacking screw 146a with respect to the inflatable bladder 146.

In an example, the forming apparatus 100 includes a first stomp foot 130. The first stomp foot 130 is movably connected to the carriage 120. The first stomp foot 130 is movable along the vertical axis 112. The first stomp foot 130 may have a flat or a curved design based upon the geometry of the forming tool 310. In an example, the first stomp foot 130 is located adjacent to the first end effector 140. The first stomp foot 130 is configured to move along the vertical axis 112 via any suitable means and is further configured to press one or more ply 320 of composite material 325 onto a forming surface 308 of a forming tool 310 and hold the one or more ply 320 of composite material 325 in place. In an example, the first stomp foot 130 movement is controlled by an actuator 147. In an example, the actuator 147 is a pneumatically actuated forming cylinder 147a. In an example, the first stomp foot 130 movement is controlled by at least one magnetic switch 360 configured to detect travel and location of the first stomp foot 130 with respect to a forming tool 310. The first stomp foot 130 is configured to apply compaction force 350 to a forming tool 310. The applied compaction force 350 may be variable or may be consistent based upon the geometry of the forming tool 310.

FIG. 14 illustrates a system 300. The system 300 comprises a forming apparatus 100, a forming tool 310, and at least one ply 320 of composite material 325. In an example, the forming tool 310 is a spar forming tool 314. In an example, the forming tool 310 is a stringer forming tool 316. In an example, the forming tool 310 is a hat stringer forming tool 312.

The forming apparatus 100 of system 300 includes a frame 110. In an example, the frame 110 is generally rectangular in shape. The frame 110 defines a vertical axis 112, a horizontal axis 114, and a longitudinal axis 116. The frame 110 surrounds a carriage 120 having a shape that is generally the same as the frame 110 but is smaller such that the carriage 120 nests within the frame 110. In an example, the carriage 120 is movably connected to the frame 110 such that it may pivot or rotate along the vertical axis 112 and horizontal axis 114 to accommodate any specific geometry or configuration and achieve a best fit position.

In an example, the forming apparatus 100 includes a first end effector 140. The first end effector 140 is movably connected to the carriage 120. In an example, the first end effector 140 is movable or controlled via an actuator an actuator 147. In an example, the actuator 147 is a pneumatically actuated forming cylinder 147a. in an example, the first end effector 140 is configured to skew along the vertical axis 112. The first end effector 140 may include one or more sensor 410 configured to detect the location of a forming tool 310 along multiple axes including a vertical axis 112, horizontal axis 114, and longitudinal axis 116 for precise forming on a complex forming tool 310. The one or more sensor 410 may be in communication with a controller 400. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140.

The first end effector 140 includes a first forming feature 142. In an example, the first forming feature 142 is a forming finger 148. In an example, first forming feature 142 is an inflatable bladder 146. The inflatable bladder 146 is configured to passively follow forming tool 310 contours by applying consistent compaction force 350. Compaction force 350 may vary. In an example, compaction force 350 may be up to 20 lbs per linear inch. The inflatable bladder 146 profile or orientation may be manipulated with one or more jacking screw 146a to conform to concave or convex profiles along the forming tool 310 length and to control the radius of the inflatable bladder 146. FIG. 12*a* and FIG. 12*b* illustrate jacking screw 146*a* with respect to the inflatable bladder 146.

In an example, the forming apparatus 100 includes a first stomp foot 130. The first stomp foot 130 is movably connected to the carriage 120. The first stomp foot 130 is movable along the vertical axis 112. The first stomp foot 130 may have a flat or a curved design based upon the geometry of the forming tool 310. In an example, the first stomp foot 130 is located adjacent to the first end effector 140. The first stomp foot 130 is configured to move along the vertical axis 112 via any suitable means and is further configured to press one or more ply 320 of composite material 325 onto a forming surface 308 of a forming tool 310 and hold the one or more ply 320 of composite material 325 in place. In an example, the first stomp foot 130 movement is controlled by an actuator 147. In an example, the actuator 147 is a pneumatically actuated forming cylinder 147*a*. In an example, the first stomp foot 130 movement is controlled by at least one magnetic switch 360 configured to detect travel and location of the first stomp foot 130 with respect to a forming tool 310. The first stomp foot 130 is configured to apply compaction force 350 to a forming tool 310. The applied compaction force 350 may be variable or may be consistent based upon the geometry of the forming tool 310.

Figure 15:
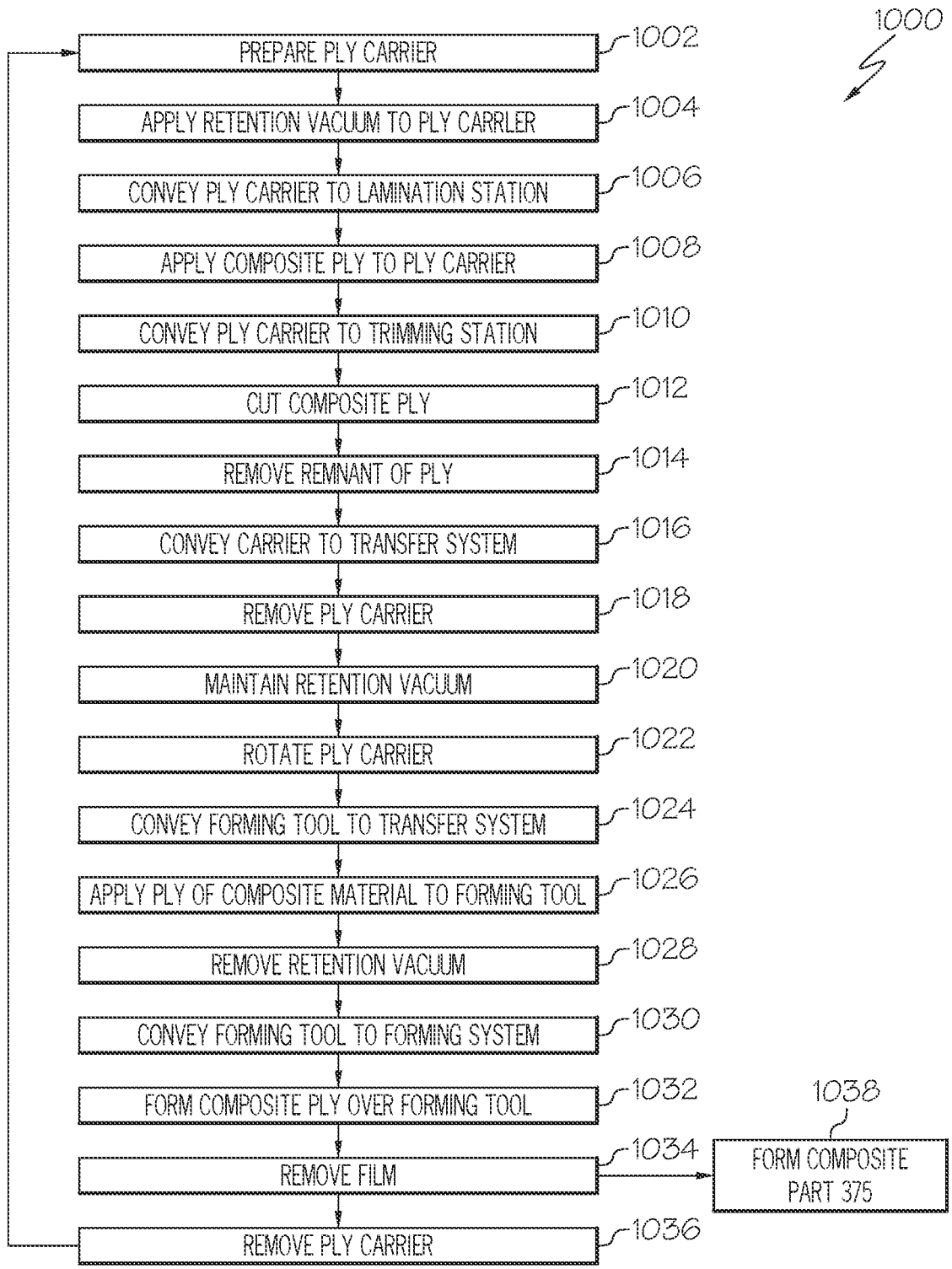
FIG. 15 is a flowchart of a method of manufacturing a composite part.

FIG. 15 illustrates a flowchart of a manufacturing composite manufacturing method 1000. Disclosed is a manufacturing composite manufacturing method 1000 of fabricating a composite part 375. In an example, the manufacturing composite manufacturing method 1000 comprises various steps. In an example, the manufacturing composite manufacturing method 1000 includes conveying a ply carrier 604 to a lamination system 612 using a carrier transfer device 610. The manufacturing composite manufacturing method 1000 includes selectively applying at least one ply 320 of composite material 325 to a ply support surface 608 of the ply carrier 604 using the lamination system 612. The manufacturing composite manufacturing method 1000 includes conveying the ply carrier 604 from the lamination system 612 to a transfer system 616 using the carrier transfer device 610. In an example, the manufacturing composite manufacturing method 1000 includes the step of removing the ply carrier 604 from the carrier transfer device 610 and applying the at least one ply 320 of composite material 325 to at least a portion of a forming surface 308 of a forming tool 310 using the transfer system 616. The manufacturing composite manufacturing method 1000 includes the step of forming the at least one ply 320 of composite material 325 over the at least a portion of the forming surface 308 of the forming tool 310 using a forming system 622. In an example, the forming system 622 comprises a forming apparatus 100.

In one or more examples, the manufacturing composite manufacturing method 1000 includes a step of (block 1002) preparing the ply carrier 604. In one or more examples, the manufacturing composite manufacturing method 1000 includes a step of (block 1004) selectively applying the retention vacuum to retain the protective slip film 160 on the base plate 124 using the carrier transfer device 610. In one or more examples, the manufacturing composite manufacturing method 1000 includes a step of (block 1006) conveying the ply carrier 604 to the lamination system 612 using the carrier transfer device 610. In one or more examples, the manufacturing composite manufacturing method 1000 includes a step of (block 1008) selectively applying the one or more ply 320 of composite material 325 to the ply support surface 608 of the ply carrier 604 using the lamination system 612. In one or more examples, the manufacturing composite manufacturing method 1000 includes a step of (block 1010) conveying the ply carrier 604 from the lamination system 612 to the trim system 614 using the carrier transfer device 610. In one or more examples, the manufacturing composite manufacturing method 1000 includes a step of (block 1012) selectively cutting the one or more ply 320 of composite material 325 into the predetermined shape using the trim system 614.

In one or more examples, the manufacturing composite manufacturing method 1000 includes a step of (block 1014) removing a remnant of the one or more ply 320 of composite material 325 from the ply support surface 608 using the scrap removal system 642, after the step of (block 1012) selectively cutting the at least one composite ply 320. In one or more examples, the manufacturing composite manufacturing method 1000 includes a step of selectively removing the retention vacuum from select areas of the protective slip film 160 using the carrier transfer device 610. In one or more examples, the manufacturing composite manufacturing method 1000 also includes a step of (block 1016) conveying the ply carrier 604 from the trim system 614 to the transfer system 616 using the carrier transfer device 610.

In one or more examples, the manufacturing composite manufacturing method 1000 includes a step of (block 1018) removing the ply carrier 604 from the carrier transfer device 610 and a step of (block 1022) reorienting (e.g., rotating) the ply carrier 604 using the transfer system 616. In one or more examples, the manufacturing composite manufacturing method 1000 includes a step of (block 1020) maintaining the retention vacuum to retain the protective slip film 160 on the base plate 124 using the transfer system 616. In one or more examples, the manufacturing composite manufacturing method 1000 includes a step of (block 1024) conveying the forming tool 310 to the transfer system 616 using the tool transfer device 646. In one or more examples, the manufacturing composite manufacturing method 1000 includes a step of (block 1026) applying the one or more ply 320 of composite material 325 to at least a portion of the forming surface 308 of the forming tool 310 using the transfer system 616. In one or more examples, the manufacturing composite manufacturing method 1000 includes a step of releasing the protective slip film 160 from the base plate 124 and a step of removing the ply carrier 604 (e.g., the base plate 124) from the forming tool 310 using the transfer system 616, and after the step of (block 1026) applying the one or more ply 320 of composite material 325 to at least a portion of the forming surface 308 of the forming tool 310. For example, the manufacturing composite manufacturing method 1000 includes a step of (block 1028) selectively removing the retention vacuum to release the protective slip film 160 from the base plate 124 while retaining the base plate 124 using the transfer system 616.

In one or more examples, the manufacturing composite manufacturing method 1000 includes a step of (block 1030) conveying the forming tool 310 from the transfer system 616 to the forming system 622 using the tool transfer device 646. In one or more examples, the manufacturing composite manufacturing method 1000 includes a step of (block 1032) forming the one or more ply 320 of composite material 325 over the at least a portion of the forming surface 308 of the forming tool 310 using the forming system 622. In one or more examples, the manufacturing composite manufacturing method 1000 includes a step of (block 1034) removing the protective slip film 160 from the one or more ply 320 of composite material 325 using the film removal system 660. In one or more examples, the manufacturing composite manufacturing method 1000 includes a step of (block 1036) returning the ply carrier 604 (e.g., the base plate 124) to the carrier transfer device 610 using the transfer system 616. In one or more examples, the above operations are repeated a number of times to fully form the composite part 375 (block 1038), at which point the process terminates.

In an example, the forming apparatus 100 of the manufacturing composite manufacturing method 1000 includes a frame 110. In an example, the frame 110 is generally rectangular in shape. The frame 110 defines a vertical axis 112, a horizontal axis 114, and a longitudinal axis 116. The frame 110 surrounds a carriage 120 having a shape that is generally the same as the frame 110 but is smaller such that the carriage 120 nests within the frame 110. In an example, the carriage 120 is movably connected to the frame 110 such that it may pivot or rotate along the vertical axis 112 and horizontal axis 114 to accommodate any specific geometry or configuration and achieve a best fit position.

In an example, the forming apparatus 100 includes a first end effector 140. The first end effector 140 is movably connected to the carriage 120. In an example, the first end effector 140 is movable or controlled via an actuator an actuator 147. In an example, the actuator 147 is a pneumatically actuated forming cylinder 147*a*. In an example, the first end effector 140 is configured to skew along the vertical axis 112. The first end effector 140 may include one or more sensor 410 configured to detect the location of a forming tool 310 along multiple axes including a vertical axis 112, horizontal axis 114, and longitudinal axis 116 for precise forming on a complex forming tool 310. The one or more sensor 410 may be in communication with a controller 400. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140.

The first end effector 140 includes a first forming feature 142. In an example, the first forming feature 142 is a forming finger 148. In an example, first forming feature 142 is an inflatable bladder 146. The inflatable bladder 146 is configured to passively follow forming tool 310 contours by applying consistent compaction force 350. Compaction force 350 may vary. In an example, compaction force 350 may be up to 20 lbs per linear inch. The inflatable bladder 146 profile or orientation may be manipulated with one or more jacking screw 146*a* to conform to concave or convex profiles along the forming tool 310 length and to control the radius of the inflatable bladder 146. FIG. 12*a* and FIG. 12*b* illustrate jacking screw 146*a* with respect to the inflatable bladder 146.

In an example, the forming apparatus 100 includes a first stomp foot 130. The first stomp foot 130 is movably connected to the carriage 120. The first stomp foot 130 is movable along the vertical axis 112. The first stomp foot 130 may have a flat or a curved design based upon the geometry of the forming tool 310. In an example, the first stomp foot 130 is located adjacent to the first end effector 140. The first stomp foot 130 is configured to move along the vertical axis 112 via any suitable means and is further configured to press one or more ply 320 of composite material 325 onto a forming surface 308 of a forming tool 310 and hold the one or more ply 320 of composite material 325 in place. In an example, the first stomp foot 130 movement is controlled by an actuator 147. In an example, the actuator 147 is a pneumatically actuated forming cylinder 147*a*. In an example, the first stomp foot 130 movement is controlled by at least one magnetic switch 360 configured to detect travel and location of the first stomp foot 130 with respect to a forming tool 310. The first stomp foot 130 is configured to apply compaction force 350 to a forming tool 310. The applied compaction force 350 may be variable or may be consistent based upon the geometry of the forming tool 310.

Figure 17:
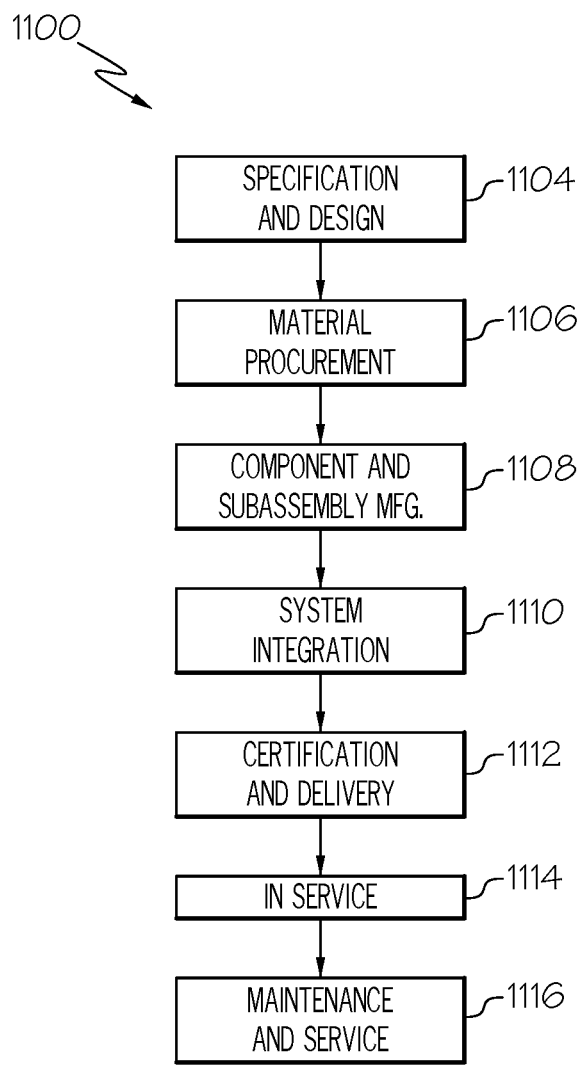
FIG. 17 is a flow diagram of an aircraft manufacturing and service methodology.
Figure 18:
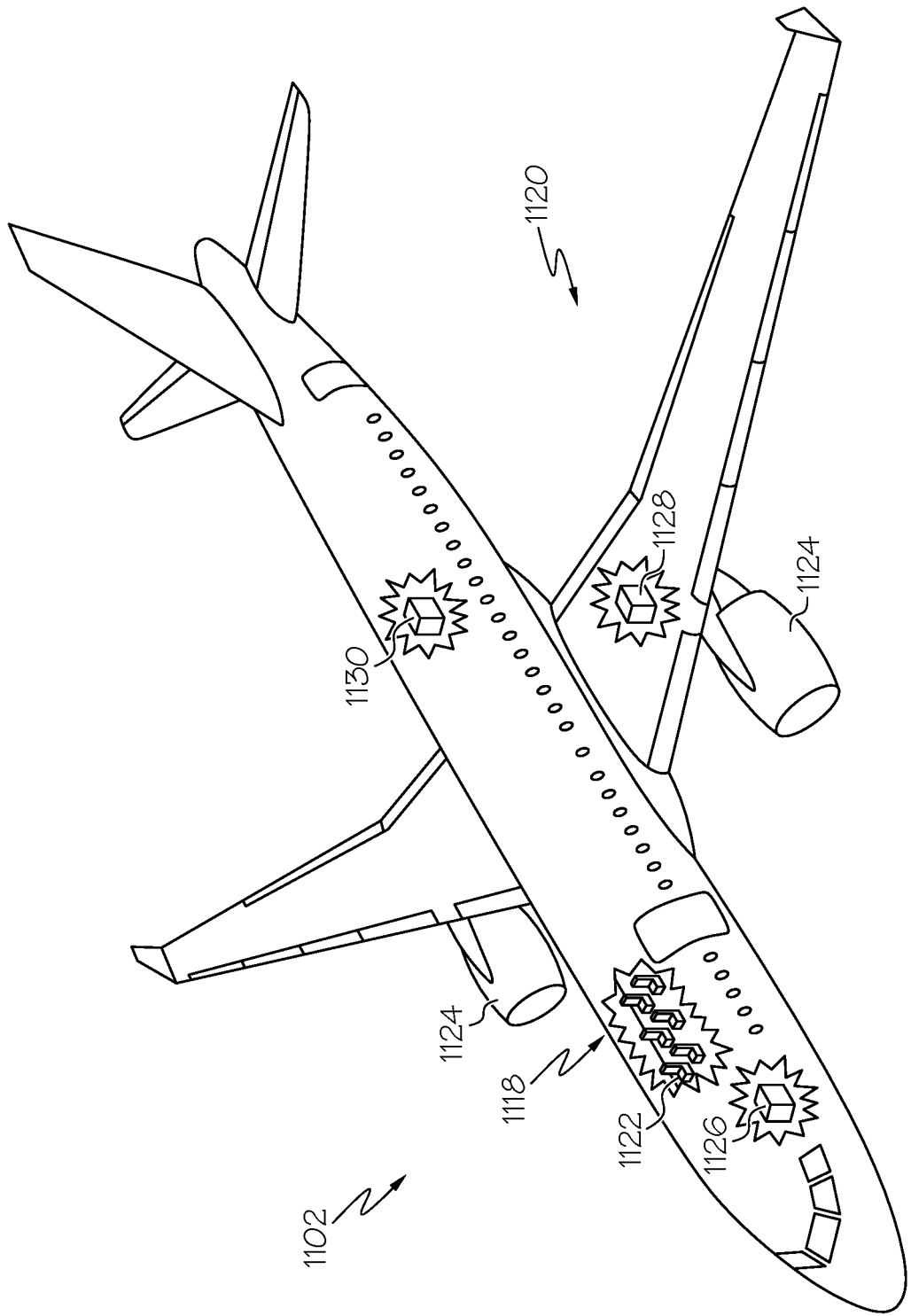
FIG. 18 is a block diagram of an aircraft.

Examples of the disclosure may be described in the context of an aircraft manufacturing and service method 1100, as shown in FIG. 17, and an aircraft 1102, as shown in FIG. 18. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the steps of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 18, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed methods and systems may be employed during any one or more of the stages of the aircraft manufacturing and service method 1100. As one example, components or subassemblies corresponding to component/subassembly manufacturing 1108, system integration 1110 and/or maintenance and service 1116 may be assembled using the disclosed methods and systems. As another example, the airframe 1118 may be constructed using the disclosed methods and systems. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more of system examples, method examples, or a combination thereof may be utilized while the aircraft 1102 is in service, for example and without limitation, to maintenance and service 1116.

Aspects of disclosed examples may be implemented in software, hardware, firmware, or a combination thereof. The various elements of the system, either individually or in combination, may be implemented as a computer program product tangibly embodied in a machine-readable storage device for execution by a processor. Various steps of examples may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed examples can be loaded onto a computer.

The above-described methods and systems are described in the context of an aircraft. However, one of ordinary skill in the art will readily recognize that the disclosed methods and systems are suitable for a variety of applications, and the present disclosure is not limited to aircraft manufacturing applications. For example, the disclosed methods and systems may be implemented in various types of vehicles including, for example, helicopters, passenger ships, automobiles, marine products (boat, motors, etc.) and the like. Non-vehicle applications are also contemplated.

Also, although the above-description describes methods and systems that may be used to manufacture an aircraft or aircraft component in the aviation industry in accordance with various regulations (e.g., commercial, military, etc.), it is contemplated that the disclosed methods and systems may be implemented to facilitate manufacturing of a part in any industry in accordance with the applicable industry standards. The specific methods and systems can be selected and tailored depending upon the particular application.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the forming apparatus 100, method 200, and system 300 have been shown and described, modifications may occur to those skilled in the art upon reading the specification. The present application includes such modifications and is limited only by the scope of the claims.

What is claimed is:

1. A forming apparatus comprising:
   a frame defining a vertical axis, a horizontal axis, and a longitudinal axis;
   a carriage movably connected to the frame;
   a first stomp foot movably connected to the carriage;
   a first end effector movably connected to the carriage, said first end effector controlled by an actuator;
   a second end effector movably connected to the carriage, said second end effector is laterally opposed from said first end effector relative to the longitudinal axis;
   a second stomp foot movably connected to the carriage, said second stomp foot located laterally between the first stomp foot and the second end effector, wherein the first stomp foot is laterally adjacent to the first end effector; and
   a ply support feature located below the first stomp foot and the second stomp foot;
   wherein the first end effector comprises a first inflatable bladder and a first jacking screw and the second end effector comprises a second inflatable bladder and a second jacking screw;
   wherein the first jacking screw manipulates the first inflatable bladder, and the second jacking screw manipulates the second inflatable bladder;
   wherein a first radius of the first inflatable bladder and a second radius of the second inflatable bladder are independently manipulated by the first jacking screw and the second jacking screw.

2. The forming apparatus of claim 1 wherein the first end effector and the second end effector are configured to skew along the vertical axis.

3. The forming apparatus of claim 1 wherein the first end effector comprises a sensor configured to detect a forming tool.

4. The forming apparatus of claim 1 wherein the second end effector comprises a sensor configured to detect a forming tool.

5. The forming apparatus of claim 1 comprising at least one magnetic switch coupled with the first stomp foot wherein the at least one magnetic switch is configured to detect stomp foot movement.

6. The forming apparatus of claim 1 wherein the first end effector and the second end effector are configured to independently move laterally relative to the longitudinal axis.

7. The forming apparatus of claim 1 comprising a first plurality of the first end effector extending along the longitudinal axis and a second plurality of the second end effector extending along the longitudinal axis and laterally opposed from the first plurality;
   wherein each first end effector of the first plurality is independently movable such that the first plurality may form a convex, concave, or linear configuration.

8. The forming apparatus of claim 1 wherein the carriage is configured to move along the vertical axis and the horizontal axis to match a forming tool orientation.

9. The forming apparatus of claim 1 comprising a protective slip film, wherein the protective slip film is connected to at least one retractable spool.

10. The forming apparatus of claim 1 wherein the first stomp foot and the second stomp foot are configured to move along the vertical axis and apply compaction force.

11. The forming apparatus of claim 1 wherein the first stomp foot is configured to pivotably move along the horizontal axis.

12. The forming apparatus of claim 1 wherein the independent adjustments of the first radius of the first inflatable bladder and of the second radius of the second inflatable bladder allow for independent conformity of the first end effector and the second end effector to a forming tool associated with the forming apparatus.

13. The forming apparatus of claim 1 wherein the first end effector and the second end effector are adjustable in a yaw angle to the longitudinal axis, the forming apparatus further comprising:
   a first pivoting bearing assembly connected to the carriage and operatively coupled to the first end effector to allow adjustments in the yaw angle of the first end effector to the longitudinal axis; and
   a second pivoting bearing assembly connected to the carriage and operatively coupled to the second end effector to allow adjustments in the yaw angle of the second end effector to the longitudinal axis;
   wherein the adjustments in the yaw angle of the first end effector and the second end effector allow for uniform application of a compaction force across a forming tool associated with the forming apparatus.

14. The forming apparatus of claim 1 wherein the first jacking screw manipulates the first inflatable bladder to conform to concave or convex profiles and to control the first radius of the first inflatable bladder and the second jacking screw manipulates the second inflatable bladder to conform to concave or convex profiles and to control the second radius of the second inflatable bladder.

15. A system comprising:
a forming apparatus comprising:
- a frame defining a vertical axis, a horizontal axis, and a longitudinal axis;
- a carriage movably connected to the frame;
- a first end effector movably connected to the carriage, said first end effector controlled by an actuator;
- a second end effector movably connected to the carriage, said second end effector is laterally opposed from said first end effector relative to the longitudinal axis;
- a first stomp foot movably connected to the carriage, said first stomp foot laterally adjacent to the first end effector;
- a second stomp foot movably connected to the carriage, said second stomp foot located laterally between the first stomp foot and the second end effector; and
- a ply support feature located below the first stomp foot and the second stomp foot;

a forming tool; and
at least one ply of composite material;
wherein the first end effector comprises a first inflatable bladder and a first jacking screw and the second end effector comprises a second inflatable bladder and a second jacking screw;
wherein the first jacking screw manipulates the first inflatable bladder to conform to concave or convex profiles and to control a first radius of the first inflatable bladder and the second jacking screw manipulates the second inflatable bladder to conform to concave or convex profiles and to control a second radius of the second inflatable bladder;
wherein the first radius of the first inflatable bladder and the second radius of the second inflatable bladder are independently manipulated.

16. A composite manufacturing system for fabricating a composite part, the composite manufacturing system comprising:
- a ply carrier comprising a ply support surface configured to support at least one ply of composite material;
- a carrier transfer device configured to convey the ply carrier;
- a lamination system configured to selectively apply the at least one ply of composite material to the ply support surface of the ply carrier;
- a transfer system configured to remove the ply carrier from the carrier transfer device and to apply the at least one ply of composite material to at least a portion of a forming surface of a forming tool; and
- a forming system configured to form the at least one ply of composite material over the at least a portion of the forming surface of the forming tool, the forming system comprises:
  the forming apparatus of claim 1.

17. A manufacturing method of fabricating a composite part, the manufacturing method comprising steps of:
- conveying a ply carrier to a lamination system using a carrier transfer device;
- selectively applying at least one ply of composite material to a ply support surface of the ply carrier using the lamination system;
- conveying the ply carrier from the lamination system to a transfer system using the carrier transfer device;
- removing the ply carrier from the carrier transfer device and applying the at least one ply of composite material to at least a portion of a forming surface of a forming tool using the transfer system; and
- forming the at least one ply of composite material over the at least a portion of the forming surface of the forming tool using a forming system, the forming system comprising:
  the forming apparatus of claim 1.

18. A forming apparatus comprising:
- a frame defining a vertical axis, a horizontal axis, and a longitudinal axis;
- a carriage movably connected to the frame;
- a first end effector movably connected to the carriage;
- a first stomp foot movably connected to the carriage and laterally adjacent to the first end effector relative to the longitudinal axis;
- a second stomp foot movably connected to the carriage and laterally adjacent to the first stomp foot relative to the longitudinal axis;
- a second end effector movably connected to the carriage and laterally adjacent to the second stomp foot relative to the longitudinal axis; and
- a ply support feature located below the first stomp foot and the second stomp foot;
wherein the first end effector comprises a first inflatable bladder and a first jacking screw and the second end effector comprises a second inflatable bladder and a second jacking screw;
wherein the first jacking screw manipulates the first inflatable bladder to conform to concave or convex profiles and to control a first radius of the first inflatable bladder and the second jacking screw manipulates the second inflatable bladder to conform to concave or convex profiles and to control a second radius of the second inflatable bladder;
wherein the first radius of the first inflatable bladder and the second radius of the second inflatable bladder are independently manipulated.

19. The forming apparatus of claim 18 wherein independent adjustments of the first radius of the first inflatable bladder and of the second radius of the second inflatable bladder allow for independent conformity of the first end effector and the second end effector to a forming tool associated with the forming apparatus;
wherein the first end effector and the second end effector are adjustable in a yaw angle to the longitudinal axis.

20. The forming apparatus of claim 18, further comprising:
- a first pivoting bearing assembly connected to the carriage and operatively coupled to the first end effector to allow adjustments in the yaw angle of the first end effector to the longitudinal axis; and
- a second pivoting bearing assembly connected to the carriage and operatively coupled to the second end effector to allow adjustments in the yaw angle of the second end effector to the longitudinal axis;
wherein the adjustments in the yaw angle of the first end effector and the second end effector allow for uniform application of a compaction force across a forming tool associated with the forming apparatus.

* * * * *